(12) United States Patent
Maliassov

(10) Patent No.: US 8,396,699 B2
(45) Date of Patent: Mar. 12, 2013

(54) MODELING SUBSURFACE PROCESSES ON UNSTRUCTURED GRID

(75) Inventor: Serguei Maliassov, Spring, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 393 days.

(21) Appl. No.: 12/738,950

(22) PCT Filed: Oct. 20, 2008

(86) PCT No.: PCT/US2008/080515
§ 371 (c)(1),
(2), (4) Date: Apr. 20, 2010

(87) PCT Pub. No.: WO2009/079088
PCT Pub. Date: Jun. 25, 2009

(65) Prior Publication Data
US 2010/0211370 A1   Aug. 19, 2010

Related U.S. Application Data

(60) Provisional application No. 61/007,761, filed on Dec. 14, 2007.

(51) Int. Cl.
*G06G 7/48* (2006.01)
(52) U.S. Cl. .............................. 703/7; 703/10
(58) Field of Classification Search ............ 703/10
See application file for complete search history.

(56) References Cited

U.S. PATENT DOCUMENTS

| | | | |
|---|---|---|---|
| 6,256,599 B1 | 7/2001 | Tiribuzi | |
| 7,043,413 B2 | 5/2006 | Ward et al. | |
| 7,099,805 B2 | 8/2006 | Fischer et al. | |
| 7,149,671 B2 | 12/2006 | Lim et al. | |
| 7,152,017 B2 | 12/2006 | Tanahashi et al. | |
| 7,164,990 B2 | 1/2007 | Bratvedt et al. | |
| 7,222,126 B2 | 5/2007 | Wolman | |
| 2004/0266301 A1 | 12/2004 | Vedula | |
| 2005/0049838 A1 | 3/2005 | Danko | |
| 2005/0203725 A1 | 9/2005 | Jenny et al. | |
| 2005/0273303 A1 | 12/2005 | Flandrin et al. | |
| 2006/0025976 A1 | 2/2006 | Kennon et al. | |
| 2006/0235666 A1 | 10/2006 | Assa et al. | |
| 2007/0073527 A1 | 3/2007 | Flandrin et al. | |

OTHER PUBLICATIONS

Brezzi, F. et al. (1991), "Mixed and hybrid finite element methods", Springer Verlag, Berlin, pp. 99-113.
Kuznetsov, Y. et al. (2003), "New mixed finite element method on polygonal and polyhedral meshes", Russian Journal of Numerical Analysis and Mathematical Modeling, v. 18, pp. 261-278.
*International Search Report and Written Opinion*, dated Dec. 10, 2008.

*Primary Examiner* — Hugh Jones
(74) *Attorney, Agent, or Firm* — ExxonMobil Upstream Research Company Law Department

(57) ABSTRACT

Embodiments of the invention involve forming a prismatic grid and solving a convection-diffusion problem using the prismatic grid and mixed finite element analysis. The prismatic grid may be formed by providing a triangular mesh on a plane of a model. The mesh is then coarsened to make cells that are less desirable larger. The coarsened grid is then projected to form the prismatic grid. Each cell of the grid is then assigned a plurality of degrees of freedom. Mixed finite element analysis of the grid produces a matrix, which is then solved to yield a solution to the convention-diffusion problem.

21 Claims, 11 Drawing Sheets

MODELING SUBSURFACE PROCESSES ON UNSTRUCTURED GRID

CROSS-REFERENCE TO RELATED APPLICATION

This application is the National Stage of International Application No. PCT/US2008/080515, that published as WO 2009/079088 and was filed on 20 Oct. 2008, which claims the benefit of U.S. Provisional Application No. 61/007,761, filed 14 Dec. 2007, each of which is incorporated herein by reference, in its entirety, for all purposes.

TECHNICAL FIELD

This application relates in general to computer modeling, and in specific to modeling subsurface processes with an unstructured grid.

BACKGROUND OF THE INVENTION

In geological exploration it is desirable to obtain information regarding the various formations and structures that exist beneath the Earth's surface. Such information may include determine geological strata, density, porosity, composition, etc. This information is then used to model the subsurface basin using the obtained data to predict the location of hydrocarbon reserves and aid in the extraction of hydrocarbon.

Unstructured grids have many appealing characteristics for modeling physical processes in complex geologic structures such as subsurface basins. Such grids may also be used in other industries, for example in the airspace industry or the auto industry. The basin or domain of interest may be modeled or represented as a set of layers of different thickness stacked together. The geological layers may be fractured along vertical or slanted surfaces and degenerate creating so-called pinch-outs. Pinch-outs are defined as parts of geological layers with near zero thickness. This complexity should be taken into account by the grid to produce a good model of the geological layers. An unstructured grid provides a better model than a structured grid. An unstructured grid may comprise a set of polyhedral elements or cells defined by their vertices and have a completely arbitrary topology. For example, a vertex of the grid can belong to a number of cells and each cell can have any number of edges or faces.

Many physical subsurface processes may be described by mathematical equations of convection-diffusion type. Examples of such processes can be fluid flow in porous media, temperature distribution, and/or pressure distribution. An important process for oil exploration is the temperature distribution or thermal modeling. Thermal modeling involves the heat moving from the magma below the crust and through the sedimentary layers and source rock. Source rocks are rocks that are involved in the formation of oil and other hydrocarbon materials. The oil and/or other hydrocarbon materials would be expelled from the source rocks and migrate elsewhere. The quality of hydrocarbon is determined by the temperature and pressure conditions inflicted on the source rocks and their surrounding area. The quality is also affected by the temperature and pressure conditions of the migration path between the source rocks and its current location. Thus, the pressure and temperature conditions of the basis throughout its history is important.

To more accurately model the processes, it is important to model not only the primary variables, such as pressure or temperature, but also model their fluxes, or the rates of flow of energy, fluids, etc. over any given surface There is a variety of known approaches for modeling these processes, such as finite difference, finite volume, or finite element methods. In these approaches, where a physical process is considered, the domain is covered by a grid. Then, the domain is approximated on a grid by introducing a set of unknowns called the degrees of freedom at specified locations of the grid cells and deriving algebraic equations for each location that connect the degree of freedom in that location with other degrees of freedom. The way of deriving such equations, as well as the locations of degrees of freedom, is different for different approaches mentioned above, but all these methods have a common feature, namely, that they only involve primary variables, such as temperature or pressure.

To compute fluxes, an interested person would first compute the desired primary variable using one of the above-described approaches, and then use numerical differentiation to compute the flux of the primary variable. All existing methods of numerical differentiation being accurate on regular grids, e.g. rectangular or parallelepiped grids, are inaccurate and very computationally expensive on unstructured grids, especially if the domain where the physical process is considered is highly heterogeneous. Moreover, the approaches for solving convection-diffusion problems using finite difference methods require Cartesian grids, and thus are not applicable in many subsurface applications, which have to employ unstructured grids. The finite element methods, being able to model complex geometries do not have local conservation property and can not be applied in many subsurface processes. Conversely, finite volume approaches are locally conservative and can be applied on a subset of unstructured grids which are locally orthogonal. However, when the unstructured grid does not posses local orthogonality property, finite volume method provides inaccurate solution. Thus, from all three classes of the approaches mentioned above, none is applicable for description of subsurface convection-diffusion processes in a basis modeled with an unstructured grid.

There is another mathematical approach to simultaneously approximate primary unknowns and their fluxes, called mixed finite element method, which is described in F. Brezzi and M. Fortin, "*Mixed and hybrid finite element methods*", Springer Verlag, Berlin 1991. Such method is proven to be locally mass conservative, accurate in the presence of heterogeneous medium, and provide accurate approximations to both, primary unknowns and fluxes. Until recently, the mixed finite element methods could not be directly applied to the domains covered by unstructured polyhedral grids, which are very common for the subsurface applications. A new version of mixed finite element method for diffusion-type equations on arbitrary polyhedral grids is proposed in Yu. Kuznetsov and S. Repin, "*New mixed finite element method on polygonal and polyhedral meshes*", Russian Journal of Numerical Analysis and Mathematical Modeling, v. 18, pp. 261-278, 2003.

BRIEF SUMMARY OF THE INVENTION

The present invention is directed to systems and methods which provide an accurate model of energy transfer and/or pressure distribution in basins being developed through geological times. At any given time, a basin is represented as a set of layers of different thicknesses stacked together. In some locations in the basin, the thickness of a layer degenerates to zero, forming a pinch-out. Embodiments of the invention use a prismatic mesh and mixed finite element analysis to model various processes in the basin, including energy transfer, e.g. thermal energy, and pressure. Thus, embodiments of the invention solve for both primary unknowns, e.g. temperature or pressure and secondary unknowns, e.g. temperature flux or pressure flux. One or more of the following aspects may be used to provide an accurate model of energy transfer and/or pressure distribution, e.g., a physical process, in basins being developed through geologic time. The model may be used to interpret a modern day reservoir, and in turn may be relied upon to control hydrocarbon production activities based on simulated results of the model. The production of hydrocarbons may be controlled, e.g., production rates from surface facilities may be controlled, wells may be strategically placed, and/or a reservoir generally characterized based on results interpreted from simulated basin model(s) generated by one or more of the following aspects.

In one general aspect, a method for modeling on a computer a physical region, wherein the physical region includes a plurality of strata, the method includes receiving data that defines at least one physical characteristic of the physical region; providing a triangular mesh on a plane of a model of the physical region, wherein the mesh comprises a plurality of cells; coarsening the triangular mesh in a non-uniform manner such that cells that are less desirable are larger; and projecting the coarsened triangular mesh in a direction orthogonal to the plane in the physical region to form a prismatic grid, wherein each of the cells of the coarsened triangular mesh is separated into sub-cells according to the strata.

Implementations of this aspect may include one or more of the following features. For example, coarsening may include projecting the data onto a plane; and using the data to determine which cells are less desirable. The model may include modeled features that model physical features in the physical region, and wherein using may include assigning a priority value to each cell, wherein the value is determined based on whether each cell is proximate to a modeled feature and a type of the modeled feature. Providing a triangular mesh may include providing a rectangular mesh on the plane; and splitting each cell of the rectangular mesh along at least one diagonal. Coarsening may include merging two adjacent triangles by eliminating a side common to the two adjacent triangles. The prismatic grid may include a plurality of prism cells, a plurality of pyramid cells, and a plurality of tetrahedron cells. The method may be used to model at least one flux of a physical process in the physical region, the method further including assigning a plurality of degrees of freedom for the flux in each sub-cell; applying mixed finite element analysis to each of the sub-cells to produce a matrix; and solving the matrix to determine the flux of the physical process in the region.

Assigning may include for each cell assigning one degree of freedom for the physical process; and assigning another degree of freedom for each face of the cell. Applying may include using a div-constant approach to form the finite element space. The physical process may be a convection-diffusion process. The physical process may be one of temperature and pressure and the physical region is a subsurface geological basin. The physical process may involve the formation of hydrocarbon material. The physical process may involve the movement of hydrocarbon material. The data may be derived from information from a sensor that measured the at least one physical characteristic of the physical region.

In another general aspect, a method for modeling a physical process and a flux of the physical process on a computer includes forming an unstructured, prismatic grid that models a physical region, wherein the physical process operates within the physical region and the prismatic grid comprises a plurality of cells; assigning a plurality of degrees of freedom for the physical process and the flux for each cell; applying mixed finite element analysis to each of the cells to produce a matrix; and solving the matrix to determine the physical process and the flux in the region.

Implementations of this aspect may include one or more of the following features. For example, forming may include providing a triangular mesh on a plane of a model of the physical region, wherein the mesh comprises a plurality of cells; coarsening the triangular mesh in a non-uniform manner such that cells that are less desirable are larger; and projecting the coarsened triangular mesh in a direction orthogonal to the plane in the physical region to form the prismatic grid. The prismatic grid may include a plurality of prism cells, a plurality of pyramid cells, and a plurality of tetrahedron cells. Assigning may include assigning one degree of freedom for the physical process for each cell; and assigning another degree of freedom for each face of the cell for each cell. Applying may include using a div-constant approach to form the finite element space. The determined physical process and flux may be used to affect a change in the physical region. The physical process may be one of temperature and pressure and the physical region is a subsurface geological basin.

In another general aspect, a computer program product having a computer readable medium having computer program logic recorded thereon for modeling at a physical process and a flux of the physical process in a physical region, the computer program product including code for forming an unstructured, prismatic grid that models the physical region; code for applying mixed finite element analysis to the prismatic grid to produce a matrix; and code for solving the matrix thereby determining the physical process and the flux in the region.

Implementations of this aspect may include one or more of the following features. For example, code for forming may include code for providing a triangular mesh on a plane of a model of the physical region, wherein the mesh comprises a plurality of cells; coarsening the triangular mesh in a non-uniform manner such that cells that are less desirable are larger; and projecting the coarsened triangular mesh in a direction orthogonal to the plane in the physical region to form the prismatic grid. The prismatic grid may include a plurality of cells, and the code for applying may include assigning one degree of freedom for the physical process to each cell; assigning another degree of freedom for each face of the cell to each cell; and using a div-constant approach to form the finite element space. The code for solving may include using preconditioned conjugate gradient analysis to solve the matrix.

Embodiments of the invention operate by projecting some or most geological and geometrical features, such as pinchout boundaries into horizontal plane. Note that projection can be non-orthogonal or slanted. Embodiments of the invention then create an unstructured grid resolving all the desired features on that plane. Note that the grid can be comprised of polygons, quadrilaterals, triangles, or combinations thereof. Embodiments of the invention then project the obtained grid back onto all boundary surfaces of all layers, thereby constructing a prismatic grid. The prismatic grid may comprise a plurality of cells, which can be prisms, tetrahedral shapes, pyramids, or combinations thereof. Note that the unstructured prismatic grid approximates boundary surfaces of all layers.

Embodiments of the invention may then operate by associating one degree of freedom per cell at the cell center for primary unknown and one degree of freedom per each face of the cells at the face center for normal components of flux.

Embodiments of the invention then discretize the problem using a mixed finite element approach, for example the approach of Yu. Kuznetsov and S. Repin. The spatial discretization produces a sparse matrix equation. Embodiments of the invention may then solve the matrix equation to get both, primary unknowns and normal components of the flux at the faces of the cells. Thus, embodiments of the invention provide more accurate modeling without greatly expanding the number of unknowns that are required to be solved.

Embodiments of the invention may form the prismatic grid by providing a triangular mesh that covers a horizontal plane of the physical region. The mesh may then be coarsened in a non-uniform manner such that cells that are less desirable are larger, while leaving the desirable cells with a more fine format. The coarsened mesh is then projected in a vertical direction in the physical region to form the prismatic mesh The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGURES. It is to be expressly understood, however, that each of the FIGURES is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
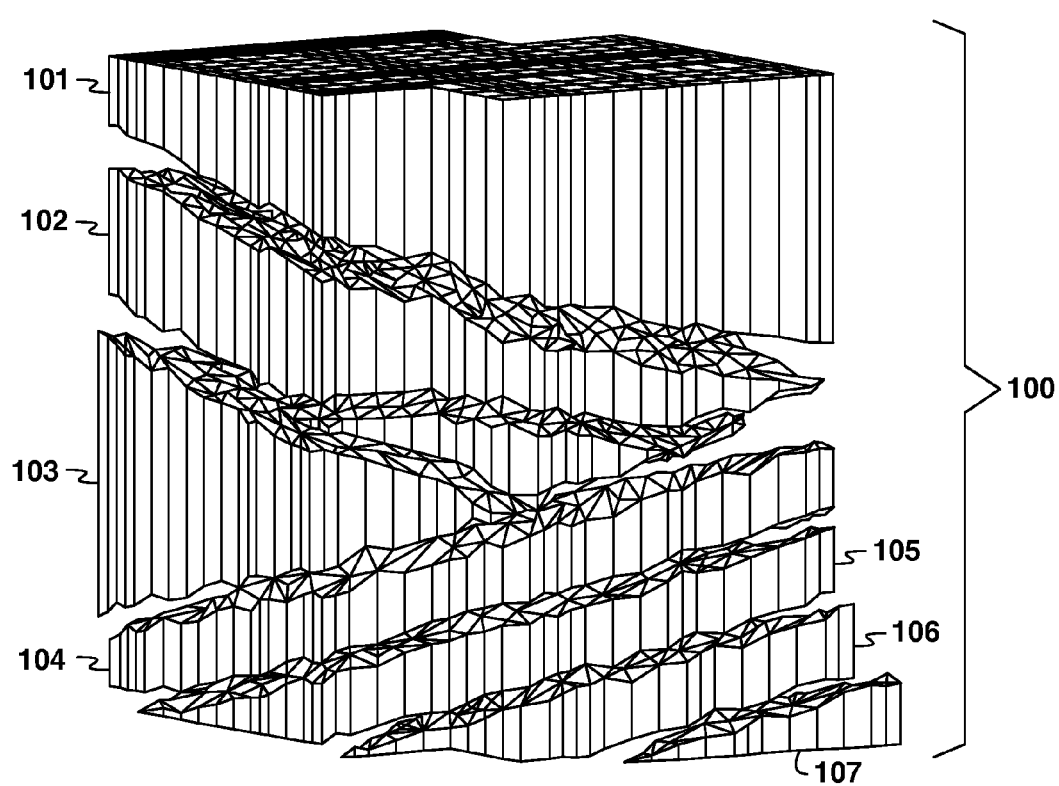
FIG. 1 depicts a domain being partitioned into layers, according to embodiments of the invention.

Embodiments of the invention are useful for modeling subsurface oil fields. The examples of the embodiments described herein may reference such oil fields. However, the embodiments may be used to model other domains involving other materials and/or processes. For example, other hydrocarbon materials may be involved, such as coal. Embodiments of the invention may be useful for mining or tunneling. Embodiments of the invention may be used for other domain types, e.g. the atmosphere, and may be useful for modeling the weather, temperature, and/or pollution. Another domain may be the oceans, and embodiments may be used to measure sound, temperature, saliently, and/or pollution. Any type of stratified domain may be modeled using embodiments of the invention. Any type of material that moves through a convection-diffusion process may be modeled using embodiments of the invention. Any type of flux that is present in the domain or material may be modeled using embodiments of the invention.

As stated earlier, embodiments of the invention can be applied to any convection-diffusion process. The following is an example of a 3D convection-diffusion type equation $$-\nabla \cdot (K \nabla p) + c \cdot p = f \text{ in } \Omega \tag{1.1}$$

where p is an unknown function (called as pressure), $K=K(x)$ is a diffusion tensor, c is a nonnegative function, $f$ is a source function, and $\Omega \subset R^3$ is a bounded computational domain. It is assumed that K is a uniformly positive definite matrix and the boundary $\partial \Omega$ of the domain $\Omega$ is partitioned into two non-overlapping sets $\Gamma_D$ and $\Gamma_N$.

Equation (1.1) is complemented with the boundary conditions $$p = g_D \text{ on } \Gamma_D$$

$$(K \nabla p) \cdot n + \sigma \cdot p = g_N \text{ on } \Gamma_N \tag{1.2}$$

where n is the outward unit normal vector to $\Gamma_N$, $\sigma$ is a nonnegative function, and $g_D$ and $g_N$ are given functions. It is assumed that equations (1.1)-(1.2) have a unique solution.

The partial differential equations (1.1)-(1.2) may be replaced by the equivalent first order system:

$$u + K \nabla p = 0 \text{ in } \Omega$$

$$\nabla \cdot u + c \cdot p = f \text{ in } \Omega \tag{1.3}$$

$$p = g_D \text{ on } \Gamma_D$$

$$-u \cdot n + \sigma \cdot p = g_N \text{ on } \Gamma_N \tag{1.4}$$

Equations (1.3)-(1.4) are the mixed formulation of equations (1.1)-(1.2). Note that in this way the primary unknown p and its flux u may be approximated simultaneously.

As stated earlier, embodiments of the invention may operate with different domains. Thus, let G be a domain in $R^2$ with a regularly shaped boundary $\partial G$, e.g. piecewise smooth and angles between pieces are greater than 0. Let computational domain $\Omega$ be defined as follows $$\Omega = \{(x,y,z) \in R^3 : (x,y) \in G, Z_{min}(x,y) \leq z \leq Z_{max}(x,y)\}$$

where $Z_{min}(x,y)$ and $Z_{max}(x,y)$ are smooth surfaces.

Let m be a positive integer and $z=Z_i(x,y)$, $i=0, \ldots, m$ be single-valued continuous functions defined on G such that $Z_0(x,y) \equiv Z_{min}(x,y)$ in $\overline{G}$ $Z_{i-1}(x,y) \leq Z_i(x,y)$ in $\overline{G}$ $i=1,m$ $Z_m(x,y) \equiv Z_{max}(x,y)$ in $\overline{G}$ These functions define the interfaces between geological layers. In other words, the computational domain $\Omega$ can be split into m sub-domains (strips or layers) which are defined as follows for all i=1, . . . , m.

$\Omega_i = \{(x,y,z) \in \Omega : (x,y) \in G, Z_{i-1}(x,y) \leq z \leq Z_i(x,y)\}.$ FIG. 1 depicts an example of the partitioning of computational domain $\Omega$ 100 into a plurality of sub-domains or layers 101-107. Note that FIG. 1 depicts the different layers in an exploded view, however for computation, the layer need not be separated. Further note that it is assumed that sub-domains $\Omega_i$, satisfy the cone condition, where the boundaries of the sub-domains do not have singular points (zero angles, etc) and, in addition, that all the sets $P_i = \{(x,y) \in \overline{G} : Z_{i-1}(x,y) = Z_i(x,y)\}$ comprise of a finite number of polygons. The boundary of corresponding set $P_i$ is denoted by $\partial P_i$.

FIG. 1 depicts the different strata of a basin. The data used to form the different layers of FIG. 1 may be determined by various techniques, such as stratigraphic analysis and/or seismic inversion, using sensors to measure various characteristics of the basin.

Figure 2A:
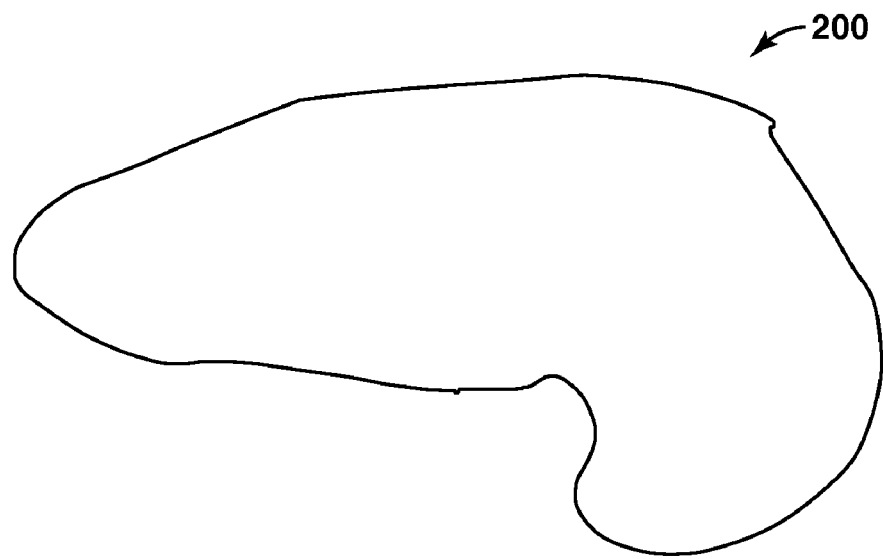
FIGS. 2A and 2B depict a domain and the domain covered with a rectangular mesh, according to embodiments of the invention.
Figure 2B:
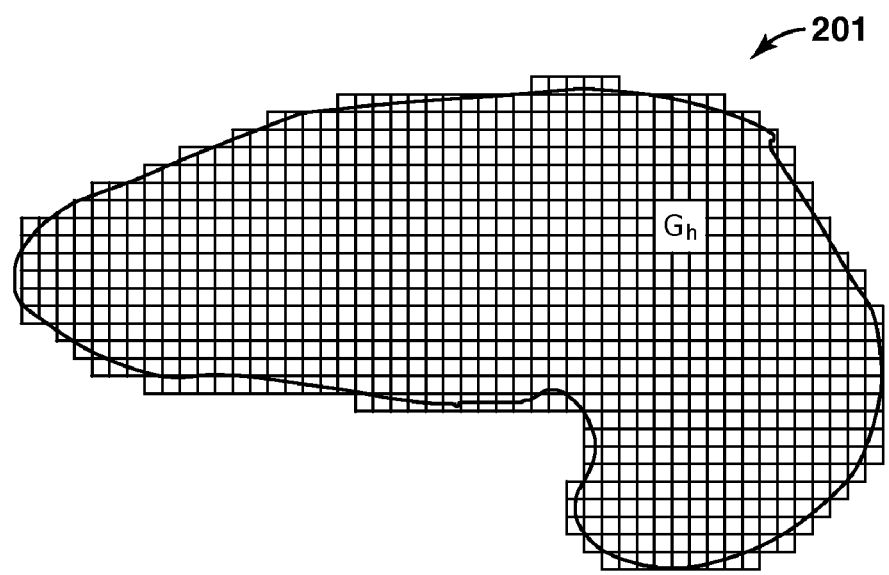
Figure 3:
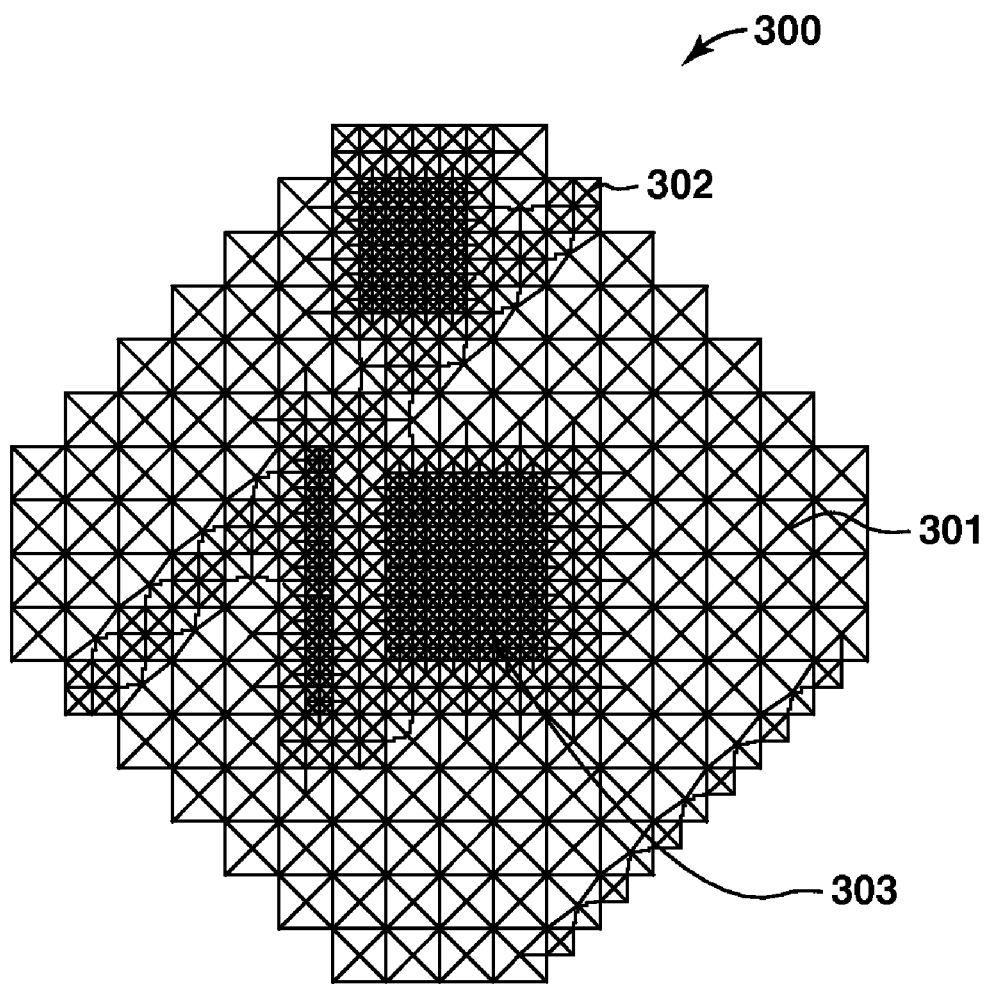
FIG. 3 depicts a non-uniformly coarsened triangular grid, according to embodiments of the invention.

The boundaries of the sets $P_i$ may be projected to the flat plane in the following manner. For any given point (x,y,z) from $\partial P_i$, the projected point has coordinates (x,y,0). All such points organize the set of closed line like those of FIG. 2A, which are used to create plane triangulation, examples of which are shown in FIG. 2B and FIG. 3.

The variational mixed formulation of differential equations (1.3)-(1.4) can be written as follows: find $u \in \hat{H}_{div}(\Omega)$, $p \in L_2(\Omega)$, and $\lambda \in L_2(\Gamma_N)$ such that $$\int_\Omega (K^{-1} u) \cdot v \, dx - \int_\Omega p(\nabla \cdot v) \, dx + \int_{\Gamma_N} \lambda(v \cdot n) \, ds = \quad (1.5)$$

$$- \int_{\Gamma_D} g_D (v \cdot n) \, ds$$

$$- \int_\Omega (\nabla \cdot u) q \, dx - \int_\Omega c \cdot p q \, dx = - \int_\Omega f q \, dx$$

$$\int_{\Gamma_N} (u \cdot n) \mu \, ds - \int_{\Gamma_N} \sigma \lambda \mu \, ds = \int_{\Gamma_N} g_N \mu \, ds$$

for all $v \in \hat{H}_{div}(\Omega)$, $q \in L_2(\Omega)$, and $\mu \in L_2(\Gamma_N)$, where $$\hat{H}_{div}(\Omega) = \left\{ v : v \in [L_2(\Omega)]^3, \nabla \cdot v \in L_2(\Omega), \int_{\partial\Omega} |v \cdot n|^2 \, ds < \infty \right\}.$$

It is noted that $\lambda$ is the restriction of the pressure function $p=p(x)$ onto $\Gamma_N$. In this formulation, all the boundary conditions are natural.

In case $\sigma=0$ on $\Gamma_N$ the variational mixed formulation can be written in the different form as follows: find $u \in \hat{H}_{div}(\Omega)$, $u \cdot n = -g_N$ on $\Gamma_N$ and $p \in L_2(\Omega)$ such that $$\int_\Omega (K^{-1} u) \cdot v \, dx - \int_\Omega p(\nabla \cdot v) \, dx = - \int_{\Gamma_D} g_D (v \cdot n) \, ds \quad (1.6)$$

-continued $$\int_\Omega (\nabla \cdot u) q \, dx + \int_\Omega c \cdot p q \, dx = \int_\Omega f q \, dx$$

for all $v \in \hat{H}_{div}(\Omega)$, $v \cdot n = 0$ on $\Gamma_N$ and $q \in L_2(\Omega)$.

In the following analysis, the equation (1.5) is considered, although the conclusions can be also be applied to equation (1.6) without loss of generality.

Embodiments of the invention use prismatic grids, which provide many appealing characteristics in modeling convection-diffusion subsurface processes. In many cases, a domain can be represented as a set of layers of different thickness stacked together. Slice-wise geological structure and unstructured geometrical features in stacked layers are represented by prismatic grids satisfactorily. The 2D geometrical data is provided by post processing of geostatistical information. Usually, the data is material properties associated with the nodes or cells of a 2D fine rectangular grid. Note that there may be millions of nodes. The presence of material data in a node implies a computational node, whereas their absence implies a node-outlier. The set of the computational nodes defines the computational domain.

The interfaces between geological layers are geostatistical data and may intersect each other resulting in topologically incorrect situations. The bottom interface is the bottom boundary of the lowest geological layer and is represented by geostatistical data as well. The geological layers may be fractured along vertical surfaces and degenerate. Pinch-outs are defined as parts of geological layers with thickness modulo not greater than a user defined threshold $\delta \geq 0$. Fault polylines are defined as intersections of the bottom geological interfaces and faults.

To simplify the description of the algorithms, the grids to be used in embodiments of the invention should satisfy some very natural requirements. The objective prismatic grid should be a logical product of a 1D grid and a 2D triangulation, whose nodes form a subset of the geostatistical rectangular grid with no nodes-outliers, with the node density equal to that in the original grid in user-specified regions of interest. Besides, the triangulation must be refined in the vicinity of user-defined faults and wells, as well as automatically detected pinch-outs. Also, the number of triangles in the 2D grid should not be greater than a user-defined number. Regarding the prismatic grid, lateral faces of prisms have to approximate the geological interfaces and form shape regular 2D triangulations.

The process described below is an example of a process that may be used to construct prismatic grid. Note that other processes may be used. Furthermore, the mixed finite element method is not bound by that type of prismatic grid. First, is the generation of 2D regular triangulation refined towards projections of pinch-outs onto the bottom geological interface, fault polylines, and points representing wells. Next, the 2D triangulation is projected onto surfaces defined by functions $Z_i(x,y)$, i=1, . . . , m, to form the resulting 3D prismatic grid. This process is further described in the following paragraphs.

To form the 2D regular triangular grid, the an exemplary process may begin with a rectangular grid. Given coordinates of the nodes in x- and y-direction, a rectangular conforming mesh $G^h$ covering domain G is generated, which is composed of cells having at least one of the four nodes with material data. For example, FIG. 2A depicts a domain 200, and FIG. 2B depicts a rectangular grid 201 covering the domain 200. Without loss of generality, it is assumed that the mesh $G^h$ is composed of squares, i.e. mesh sizes in x- and y-direction are equal, $h_x = h_y = h$.

Next, according to an embodiment, each rectangular cell is split by its diagonal into two triangles. One processes that may be used to form the triangles is described below, note that other processes may be used. The choice between two possible diagonals may be made according to the following rule. Let each rectangular cell be assigned an integer equal to the sum of minimal x- and y-indices of its nodes. For the cells with even numbers, the splitting diagonal has the node of the cell with minimal x- and y-indices. For the cells with odd number, the other diagonal is chosen. The above process specifies the triangulation uniquely for a given set of nodes with a given material data distribution. Alternating the directions of the diagonals reduces issues of grid orientation. As an alternative process to form triangles, each rectangular cell may be split into four triangles by using both diagonals.

The generated triangulation is projected onto the bottom geological interface as described in paragraph [0036]. Note that there can be defined regions of interest $\omega_i$ in the domain G, where the modification of the grid is not necessary or not desired.

Let $P_i^h$ denote the maximal subset of rectangular elements of $G^h$, which belong to $P_i$. If there is no element of $G^h$ which belongs to $P_i$ but there is the vertex of $G^h$ which belongs to $P_i$ then this vertex is said to belong to $P_i^h$. Then the set is defined $$\partial P^h = \bigcup_{i=1}^{m} \partial P_i^h$$

which is known as a "pinch-out" projection. Based on that definition, "pinch-out" projections are the subset of edges and vertices belonging to $G^h$.

Next, according to an embodiment, different priorities are assigned to the triangles. A priority, or an integer marker, is assigned to each triangle of the fine grid. Values of the priority control coarsening process.

At the beginning, zero priority is assigned to all the triangles. For triangles whose closures intersect faults, their priorities are changed to 1. To find triangles intersecting faults, the following method may be used. First, the triangles are extracted from the fault triangulations, which intersect the most bottom geological interface. Second, each extracted triangle is checked for the intersection with the fine grid triangles. For triangles whose closures intersect pinch-outs, their priorities are changed to 2. These triangles are defined as those where the following condition is violated: in all triangle nodes, the thickness of a geological layer is either greater than δ or less than −δ. For triangles whose closures contain well points, their priorities are changed to 3. For triangles that belongs to a user defined region of interest $\omega_i$, their priorities are changed to 4. For triangles that satisfy several conditions, their priorities are changed to the maximum priority value.

After the priorities have been assigned, the triangular grid may be non-uniformly coarsened. The fine portion of the grid may have a large number of equally small triangles. These areas are more desirable because they contain more information, include interesting geologic features, e.g. wells, faults, pinch-outs, and/or are indicated as desirable by a user. The coarsened portions of the grid are not as desirable as the finer portions of the grid. The grid may have a range of coarsening, where the most coarsened indicates the portions having little or no desirable qualities, and the areas with no coarsening indicates the most desirable areas. Coarsened areas between the most coarsened and no coarsened indicate area with some desirable aspects.

Coarsening is a sequence of triangle-merging procedures. For example, two triangles may be coupled into one by elimination of their common side. This procedure comprises two stages. First, certain triangles are marked for coarsening. Second, they are coarsened. It should be noted that the grid conformity may cause coarsening of unmarked triangles. Each coarse triangle inherits the maximal priority of the two merging triangles. In addition to the priority, each triangle is assigned another integer denoted as level. Any triangle of the initial fine grid has level 1. Coarsening may be applied to a pair of triangles of the same level j, and result in a coarser triangle with level j+1.

Below is one example of a coarsening procedure according to embodiments of the invention. Note that other procedures may be used.

The coarsening procedure can be described as the loop:

1) Set k = 1.
2) Form the set M from triangles with zero priority, which coarsening will not cause coarsening other triangles with non-zero priority.
3) If M is empty then go to 6.
4) Coarsen triangles from M.
5) Go to 2.
6) If the number of triangles in the new grid is not greater than the user defined threshold $Nt_{usr}$, then Stop.
7) Form the set M from triangles with non-zero priority not greater than k, which coarsening will not cause coarsening other triangles with priority greater than k.
8) Coarsen triangles from M.
9) If k ≤ 3, then set k = k + 1, otherwise set k = 1.
10) Go to 1.

The output triangular grid $\hat{G}_h$ has nodes coinciding with certain nodes of the projected input rectangular mesh and fine triangles in the region of interest, as well as triangles refining towards well points, fault polylines, and pinch-outs. FIG. 3 depicts an example of the above grid coarsening procedure. The resulting grid 300 depicts non-uniform areas of most coarse triangles 301, coarsened triangles 302, and fine triangles 303. Note that the fine triangles may have some coarsening or no coarsening. Note that in FIG. 3 the triangles have been formed by using the two diagonal method described above.

Figure 4:
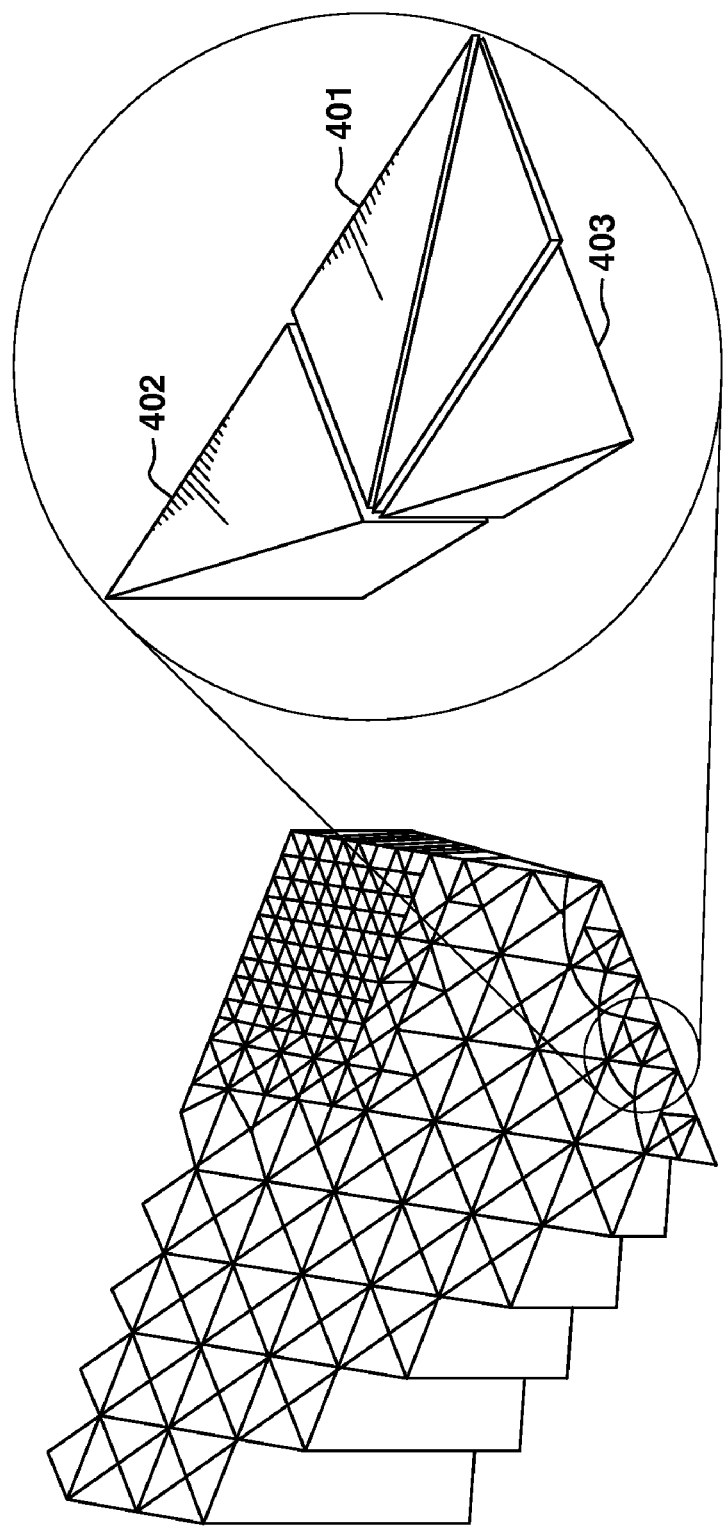
FIG. 4 depicts different types of cells formed according to embodiments of the invention.

After coarsening, the 3D prismatic grid may be formed. Let $e_h$ be a triangle in the triangulation $\hat{G}_h$ of G and $a^{(k)}=(a_x^{(k)}, a_y^{(k)})$, k=1, 2, 3, be the vertices of $e_h$. Consider three vertical lines $(x,y)=a^{(k)}$, k=1, 2, 3, in $R^3$ and denote by $a^{(k,i)}$, k=1, 2, 3, their intersections with the surfaces $z=Z_i(x, y)$, i=0, ..., m. Then, any polyhedron with the vertices located on the neighboring surfaces is either a vertical prism (all six vertices are different), or a pyramid (two vertices coincide, e.g. the corresponding vertex $a^{(k)}$, k=1, 2, 3, belongs to $P^h=\cap P_i^h$), or a tetrahedron (two pairs of the vertices coincide, i.e. two vertices of the set $a^{(k)}$, k=1, 2, 3, belong to $P^h$). FIG. 4 depicts a portion of a 3D prismatic grid with the three types of prisms, namely a vertical prism 401, a pyramid 402, and a tetrahedron 403. In other words, a pyramid is a prism with one edge disappearing, and a tetrahedron is a prism with two edges disappearing.

Figure 5:
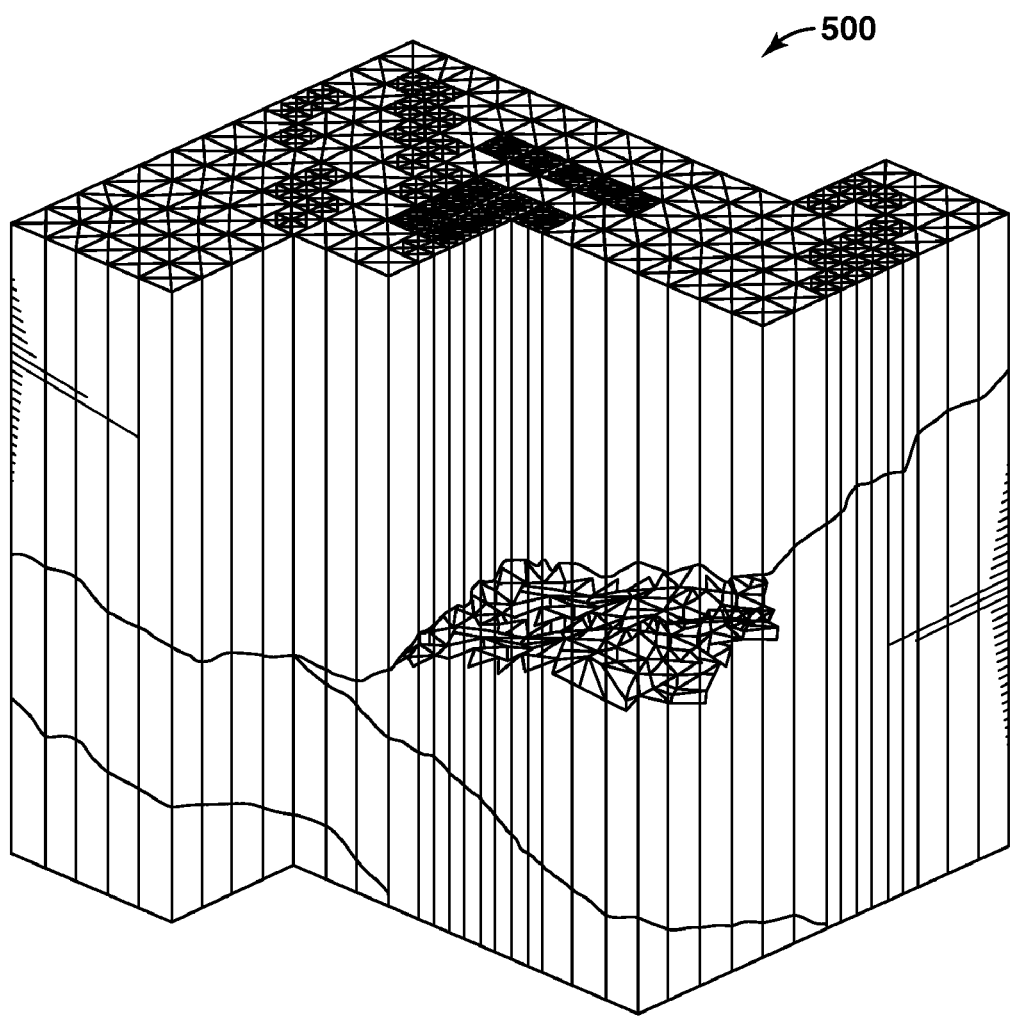
FIG. 5 depicts a 3D prismatic grid formed according to embodiments of the invention.

Performing the above operation for all the triangles in $\hat{G}_h$ will provide the partitioning $\Omega_h$ of the domain $\Omega$. In particular cell, each surface $z=Z_i(x,y)$ is approximated by piecewise triangular surface $z=Z_i^{(h)}(x,y)$, which comprises of the top (bottom) triangles of the prisms as well as the particular faces the pyramids and the tetrahedrons. FIG. 5 depicts an example of a 3D prismatic grid 500.

After completion of the 3D prismatic grid, the grid may be subject to mixed finite element analysis. In the previous section it was indicated that the grid $\Omega_h$ comprises elements $\{E_k\}$ which are either vertical prisms, or pyramids, or tetrahedrons. To formulate the mixed finite element (MFE) method for equation (1.5), the finite element subspaces of the spaces $\hat{H}_{div}(\Omega)$, $L_2(\Omega)$, and $L_2(\Gamma_N)$ should be defined.

The finite element space $L_h \subset L_2(\Omega)$ comprises functions $p_h$ which are constants on each grid cell $E_k \subset \Omega_h$. The finite element space $\tilde{\Lambda}_h \subset L_2(\Gamma_N)$ comprises functions $\lambda_h$ which are constants on each intersection of a grid cell $E_k$ in $\Omega_h$ with boundary part $\Gamma_N$. These intersections may be either quadrilaterals or triangles.

One problem in mixed finite element methods is the design of finite element subspaces $V_h$ of the space $\hat{H}_{div}(\Omega)$. For computational efficiency only those finite element vector-functions should be considered which have constant normal components on the interfaces $\Gamma_{kl}$ between neighboring cells $E_k$ and $E_l$, $k>l$, as well as on the intersections $\hat{\Gamma}_{kN}$ of a cell $E_k$ with boundary $\Gamma_N$. The dimension of the finite element subspace of the space $\hat{H}_{div}(\Omega)$ is equal to the total number of different interfaces $\{\Gamma_{kl}\}$ and $\{\hat{\Gamma}_{kN}\}$. This finite element space may be constructed based on "div-constant" approach described in Yu. Kuznetsov and S. Repin, "*New mixed finite element method on polygonal and polyhedral meshes*", Russian Journal of Numerical Analysis and Mathematical Modeling, v. 18, pp. 261-278, 2003.

For a tetrahedral cell, T, the finite element space $V_h|_T$ coincides with a classical lowest order Raviart-Thomas finite element space $RT_0(T)$ (see F. Brezzi and M. Fortin, "*Mixed and hybrid finite element methods*", Springer Verlag, Berlin 1991). A finite element vector-valued function $w_h \in RT_0(T)$ has four degrees of freedom (DOF), i.e.

$$w_h(x) = \sum_{i=1}^{4} w_i \phi_i(x)$$

where $\phi_i(x)$ are the basis vector-functions associated with the faces $\gamma_i$ of the tetrahedron T, i=1, 2, 3, 4.

Figure 6:
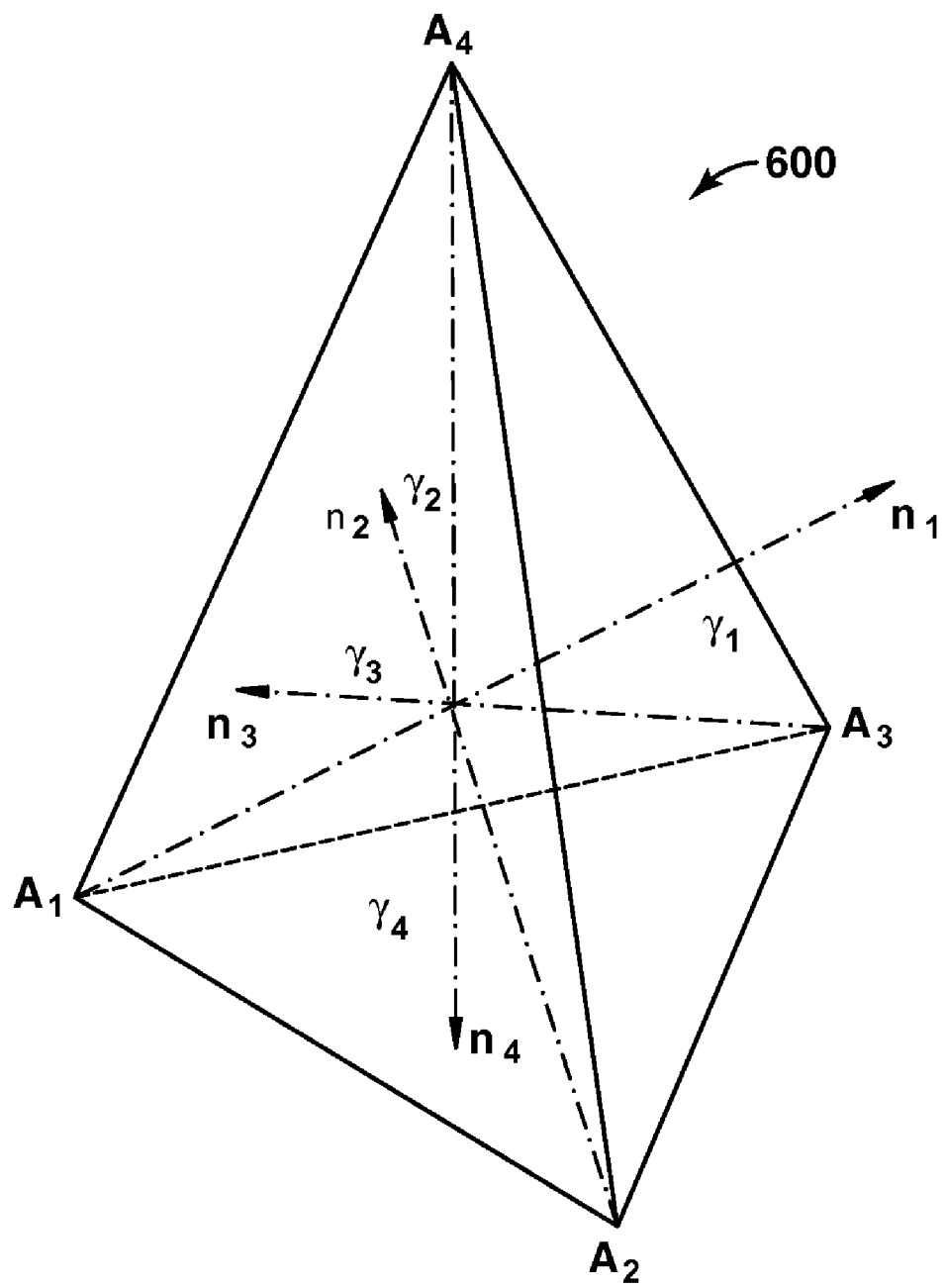
FIG. 6 depicts a tetrahedral cell used by embodiments of the invention.

Denote by $\gamma_j$ the face of tetrahedron T opposite to the vertex $A_j$, namely, $\gamma_1$ is the face $A_2A_3A_4$, $\gamma_2$ is the face $A_3A_4A_1$, $\gamma_3$ is the face $A_4A_1A_2$, and $\gamma_4$ is the face $A_1A_2A_3$. Let $n_j$ be the outward unit vector on the face $\gamma_j$, and $h_i$ be the length of the perpendicular from the vertex $A_j$ onto the face $\gamma_j$, j=1, 2, 3, 4. Such a tetrahedral cell 600 is shown in FIG. 6.

The space of the lowest order Raviart-Thomas elements on a tetrahedron T can be defined as $$RT_0(T) = \text{span}\{\phi_1, \phi_2, \phi_3, \phi_4\},$$

where the basis vector functions $\phi_i$ satisfy the conditions $\phi_i|_{\gamma_j} \cdot n_j = \delta_{ij}$ and $\delta_{ij}$ is the Kronecker symbol, which is equal to 1 if i=j, and 0 otherwise.

Straightforward calculations show that the basis functions can be defined explicitly by $$\phi_i(x) = \frac{1}{h_i}(x - x^{(i)}) \equiv \frac{|\gamma_i|}{3|T|}(x - x^{(i)}),$$

where $x^{(i)}$ are the coordinates of the vertices $A_i$, i=1, 2, 3, 4.

For a Pyramidal cell, P, when a cell $P \in \Omega_h$ is a quadrilateral pyramid the finite element space $V_h|_P$ is constructed using the "div-constant" approach.

Figure 7:
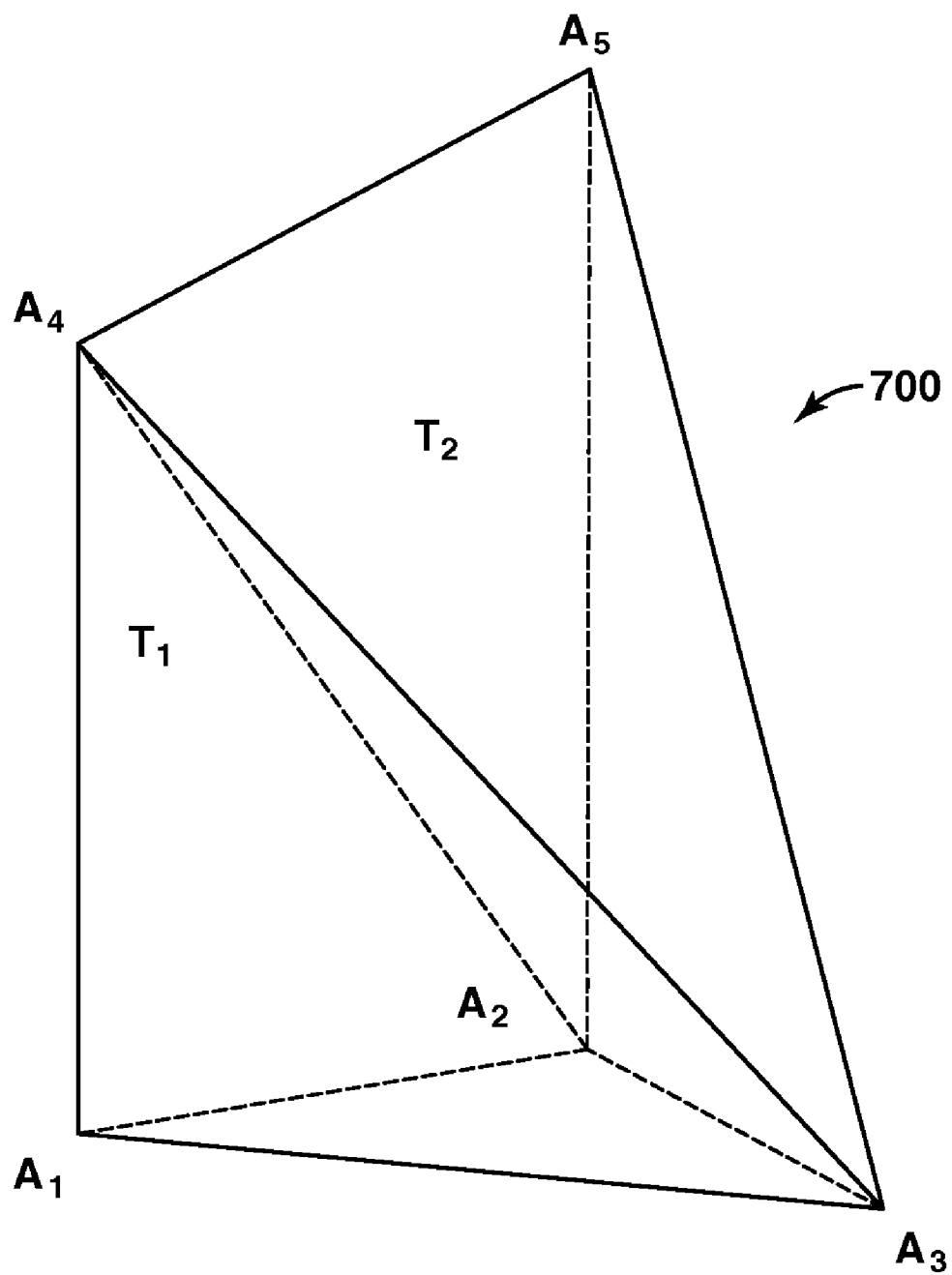
FIG. 7 depicts a pyramidal cell used by embodiments of the invention.

The faces of pyramid P are denoted by $\gamma_j$, j=1, 2, 3, 4, 5, namely, $\gamma_1$ is the face $A_2A_3A_5$, $\gamma_2$ is the face $A_1A_3A_4$, $\gamma_3$ is the face $A_1A_2A_4A_5$, $\gamma_4$ is the face $A_1A_2A_3$, and $\gamma_5$ is the face $A_3A_4A_5$. Such a pyramid cell 700 is shown in FIG. 7.

To describe the "div-const" approach, the pyramid P is partitioned into two tetrahedrons $T_1$ and $T_2$. It can be done in two different ways and both ways provide workable algorithm described below. Thus, without loss of generality, it is assumed that the pyramid P is divided into two tetrahedrons $T_1 = A_1A_2A_3A_4$ and $T_2 = A_2A_3A_4A_5$. Let $n_i$ denote the unit outer normal vectors to the faces $\gamma_i$, i=1, 2, 3, 4, 5, and by $n_6$ the unit normal vector to the interface $\gamma_6 = A_2A_3A_4$ between tetrahedrons $T_1$ and $T_2$ directed from $T_1$ to $T_2$.

On each tetrahedron, the classical lowest order Raviart-Thomas space of vector-functions is construct, the sets of basis functions $\{\phi_i^{(k)}\}_{i=1}^{4}$, k=1, 2, are determined, and vector field $u_h$ in P is defined as follows:

$$u_h(x) = \begin{cases} u_6 \phi_1^{(1)}(x) + u_2 \phi_2^{(1)}(x) + u_3 \phi_3^{(1)}(x) + u_4 \phi_4^{(1)}(x) \text{ in } T_1 \\ u_5 \phi_1^{(2)}(x) + u_3 \phi_2^{(2)}(x) + u_1 \phi_3^{(2)}(x) - u_6 \phi_4^{(2)}(x) \text{ in } T_2 \end{cases} \quad (2.1)$$

This representation shows that the vector-function $u_h$ is linear on each of the tetrahedrons $T_1$ and $T_2$, belongs to the space $H_{div}(P)$, and satisfies the required conditions $$u_h|_{\gamma_j} \cdot n_j = u_j, \, j=1,2,3,4,5.$$

To determine the unknown value $u_6$ of the normal component of flux on the interface $\gamma_6$ the following condition should be operative $$\nabla \cdot u_h = \text{const in } P. \quad (2.2)$$

From definition (2.1) of $u_h$ the expressions for divergence of $u_h$ in $T_1$ and $T_2$ are obtained. Application of the divergence operator for both sides of (2.1) yields $$\nabla \cdot u_h|_{T_1} = u_6 \nabla \cdot \phi_1^{(1)} + u_2 \nabla \cdot \phi_2^{(1)} + u_3 \nabla \cdot \phi_3^{(1)} + u_4 \nabla \cdot \phi_4^{(1)} \quad (2.3)$$

and $$\nabla \cdot u_h|_{T_2} = -u_6 \nabla \cdot \phi_4^{(2)} + u_5 \nabla \cdot \phi_1^{(2)} + u_3 \nabla \cdot \phi_2^{(2)} + u_1 \nabla \cdot \phi_3^{(2)} \quad (2.4)$$

Since $\nabla \cdot u_h|_{T_1} = \nabla \cdot u_h|_{T_2}$ it follows that $$u_6 = \frac{u_5 \nabla \cdot \phi_1^{(2)} + u_3 \nabla \cdot \phi_2^{(2)} + u_1 \nabla \cdot \phi_3^{(2)} - u_2 \nabla \cdot \phi_2^{(1)} - u_3 \nabla \cdot \phi_3^{(1)} - u_4 \nabla \cdot \phi_4^{(1)}}{\nabla \cdot \phi_1^{(1)} + \nabla \cdot \phi_4^{(2)}} \quad (2.5)$$

The value of $u_6$ under assumption (2.2) can be found in a different way. First, the Stokes' formula is applied $$\int_P \nabla \cdot u_h \, dx = \int_{\partial P} u_h \cdot n \, ds$$

and the value of $\nabla \cdot u_h$ is determined by $$\nabla \cdot u_h = \frac{u_1|\gamma_1| + u_2|\gamma_2| + u_3|\gamma_3| + u_4|\gamma_4| + u_5|\gamma_5|}{|P|},$$

where $|\gamma_i|$ is the area of corresponding face $\gamma_i$ and $|P|$ is the volume of the pyramid. Second, the value of $u_6$ is determined from (2.4):

$$u_6 = \frac{u_5 \nabla \cdot \phi_1^{(2)} + u_3 \nabla \cdot \phi_2^{(2)} - u_1 \nabla \cdot \phi_3^{(2)} - \nabla \cdot u_h}{\nabla \cdot \phi_4^{(2)}} \quad (2.6)$$

At this point the basis functions $\{\phi_i\}_{i=1}^5$ on pyramid P are reconstructed which satisfy the conditions $\phi_i|_{\gamma_j} \cdot n_j = u_j^{(i)} \equiv \delta_{ij}$, i,j=1, 2, 3, 4, 5.

Since the values of normal components of the basis functions on the faces of pyramid P are known, the values of its normal components $u_6^{(i)}$, i=1, 2, 3, 4, 5, on the internal face $\gamma_6$ can be found from the formulas (2.5) and (2.6). Therefore, the explicit representation of basis functions is given by $$\phi_1 = \begin{cases} u_6^{(1)} \phi_1^{(1)} & \text{in } T_1 \\ \phi_3^{(2)} - u_6^{(1)} \phi_4^{(2)} & \text{in } T_2 \end{cases}$$

$$\phi_2 = \begin{cases} \phi_2^{(1)} + u_6^{(2)} \phi_1^{(1)} & \text{in } T_1 \\ -u_6^{(2)} \phi_4^{(2)} & \text{in } T_2 \end{cases}$$

$$\phi_3 = \begin{cases} \phi_3^{(1)} + u_6^{(3)} \phi_1^{(1)} & \text{in } T_1 \\ \phi_2^{(2)} - u_6^{(3)} \phi_4^{(2)} & \text{in } T_2 \end{cases}$$

$$\phi_4 = \begin{cases} \phi_4^{(1)} + u_6^{(4)} \phi_1^{(1)} & \text{in } T_1 \\ -u_6^{(4)} \phi_4^{(2)} & \text{in } T_2 \end{cases}$$

$$\phi_5 = \begin{cases} u_6^{(5)} \phi_1^{(1)} & \text{in } T_1 \\ \phi_1^{(2)} - u_6^{(5)} \phi_4^{(2)} & \text{in } T_2 \end{cases}$$

For a prismatic cell with a triangular base, let $\Pi \in \Omega_h$. The finite element space $V_h|_\Pi$ is constructed using the "div-const" approach.

Figure 8A:
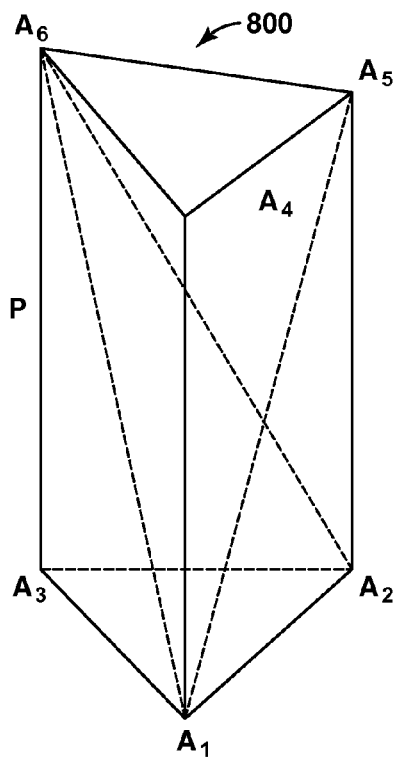
FIGS. 8A-8D depict a prismatic cell used by embodiments of the invention, and the separated into three tetrahedrons, according to embodiments of the invention.

Denote by $\gamma_j$ the faces of prism $\Pi$, namely, $\gamma_1$ is the face $A_2A_3A_5A_6$, $\gamma_2$ is the face $A_1A_3A_4A_6$, $\gamma_3$ is the face $A_1A_2A_4A_5$, $\gamma_4$ is the bottom face $A_1A_2A_3$, and $\gamma_5$ is the top face $A_4A_5A_6$. Such a prism cell 800 is shown in FIG. 8A.

Figure 8B:
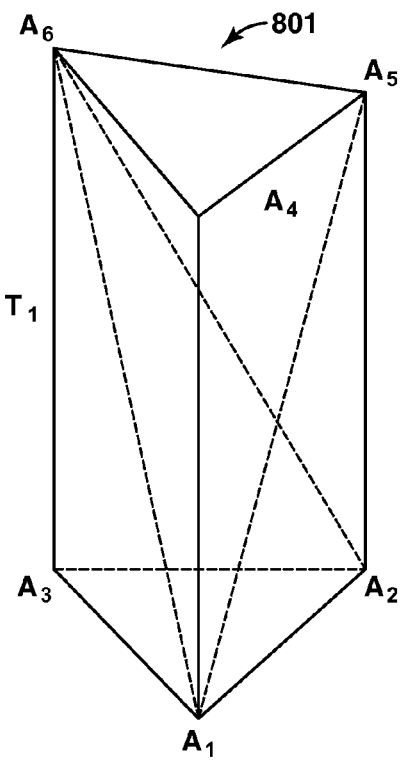
Figure 8C:
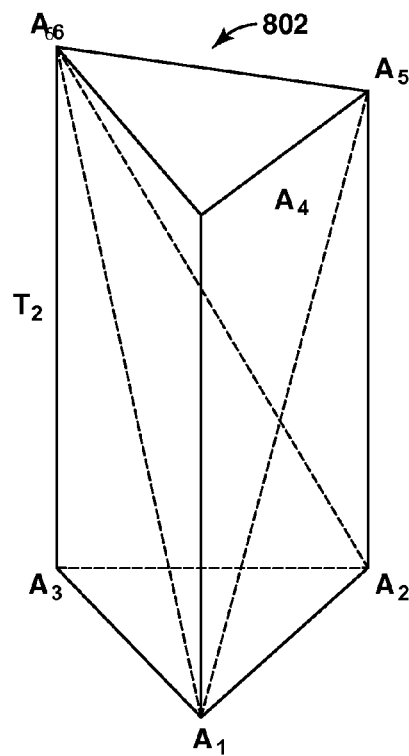
Figure 8D:
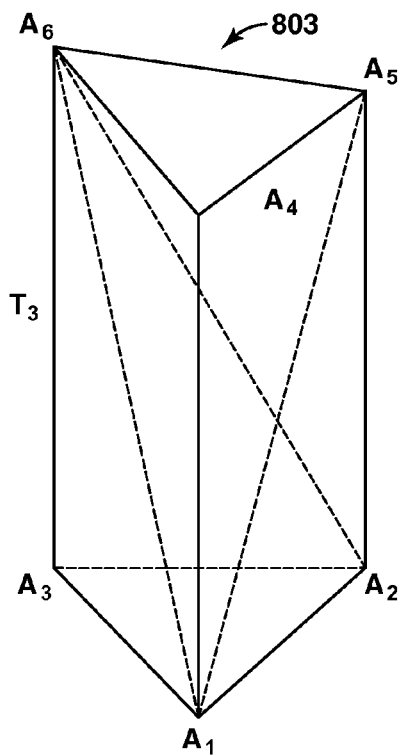

In order to apply the "div-const" approach according to an embodiment, prism $\Pi$ is partitioned into three tetrahedrons $T_1$, $T_2$, and $T_3$. The partitioned tetrahedrons 801, 802, 803 are shown in FIGS. 8B-8D. Without loss of generality, it can be assumed that prism $\Pi$ is divided into tetrahedrons $T_1 = A_1A_2A_3A_6$, $T_2 = A_1A_4A_5A_6$, and $T_3 = A_1A_2A_5A_6$. The partitioned tetrahedrons 801, 802, 803 are shown in FIGS. 8B-8D.

Let $n_i$, i=1, 2, 3, 4, 5, denote the unit outward normal vectors to faces $\gamma_i$, $n_6$ denote the unit normal vector to the interface $\gamma_6 = A_1A_2A_6$ between tetrahedrons $T_1$ and $T_3$ directed from $T_1$ to $T_3$, and, finally, by $n_7$ the unit normal vector to the interface $\gamma_7 = A_1A_5A_6$ between tetrahedrons $T_2$ and $T_3$ directed from $T_2$ to $T_3$. On each tetrahedron the classical lowest order Raviart-Thomas finite element space is constructed, the sets of basis functions $\{\phi_i^{(k)}\}_{i=1}^4$, k=1, 2, 3, are determined, and vector field $u_h$ in $\Pi$ is defined as follows $$u_h(x) = \begin{cases} u_1\phi_1^{(1)}(x) + u_2\phi_2^{(1)}(x) + u_6\phi_3^{(1)}(x) + u_4\phi_4^{(1)}(x) & \text{in } T_1 \\ u_5\phi_1^{(2)}(x) + u_7\phi_2^{(2)}(x) + u_2\phi_3^{(2)}(x) + u_3\phi_4^{(2)}(x) & \text{in } T_2 \\ u_1\phi_1^{(3)}(x) - u_7\phi_2^{(3)}(x) - u_6\phi_3^{(3)}(x) + u_3\phi_4^{(3)}(x) & \text{in } T_3 \end{cases} \quad (2.7)$$

With this representation, the vector-function $u_h$ is linear on each of the tetrahedrons $T_1$, $T_2$, and $T_3$, belongs to the space $H_{div}(\Pi)$, and satisfies the required conditions $$u_h|_{\gamma_j} \cdot n_j = u_j, \quad j=1,2,3,4,5.$$

The natural choice for the unknown normal components $u_6$ and $u_7$ on subsidiary interfaces $\gamma_6$ and $\gamma_7$, respectively, comes from the condition where the divergence of $u_h$ is a constant on $\Pi$, i.e.

$$\nabla \cdot u_h = \text{const in } \Pi. \quad (2.8)$$

The unknown values $u_6$ and $u_7$ are obtained in a similar way as discussed with respect to pyramidal cells. First, the value of $\nabla \cdot u_h$ on $\Pi$ is determined using Stokes' formula $$\int_\Pi div u_h \, dx = \int_{\partial \Pi} u_h \cdot n \, ds, \quad (2.9)$$

therefore $$\nabla \cdot u_h = \frac{u_1|\gamma_1| + u_2|\gamma_2| + u_3|\gamma_3| + u_4|\gamma_4| + u_5|\gamma_5|}{|\Pi|},$$

where $|\gamma_i|$ is the area of corresponding face $\gamma_i$ and $|\Pi|$ is the volume of the prism. Second, the values of $u_6$ and $u_7$ are computed as $$u_6 = \frac{\nabla \cdot u_h - u_1 \nabla \cdot \phi_1^{(1)} - u_2 \nabla \cdot \phi_2^{(1)} - u_4 \nabla \cdot \phi_4^{(1)}}{\nabla \cdot \phi_3^{(1)}}, \quad (2.10)$$

and $$u_7 = \frac{\nabla \cdot u_h - u_5 \nabla \cdot \phi_1^{(2)} - u_2 \nabla \cdot \phi_3^{(2)} - u_3 \nabla \cdot \phi_4^{(2)}}{\nabla \cdot \phi_2^{(2)}}. \quad (2.11)$$

At this point, the basis functions $\{\phi_i\}_{i=1}^5$ on prism $\Pi$ are reconstructed which satisfy the following conditions: $\phi_i|_{\gamma_j} \cdot n_j = u_j^{(i)} \equiv \delta_{ij}$, i,j=1, 2, 3, 4, 5.

Since the values of normal components of the basis functions on the faces of the prism $\Pi$ are known, the values of normal components $u_6^{(i)}$ and $u_7^{(i)}$, i=1, 2, 3, 4, 5, on the internal faces $\gamma_6$ and $\gamma_7$ can be determined, respectively, by formulas (2.10) and (2.11). Therefore, the explicit representation of basis functions is given by $$\phi_1 = \begin{cases} \phi_1^{(1)} + u_6^{(1)} \phi_3^{(1)} & \text{in } T_1 \\ u_7^{(1)} \phi_2^{(2)} & \text{in } T_2 \\ \phi_1^{(3)} - u_6^{(1)} \phi_3^{(3)} - u_7^{(1)} \phi_2^{(3)} & \text{in } T_3 \end{cases}$$

$$\phi_2 = \begin{cases} \phi_2^{(1)} + u_6^{(2)} \phi_3^{(1)} & \text{in } T_1 \\ \phi_3^{(2)} + u_7^{(2)} \phi_2^{(2)} & \text{in } T_2 \\ -u_6^{(2)} \phi_3^{(3)} - u_7^{(2)} \phi_2^{(3)} & \text{in } T_3 \end{cases}$$

$$\phi_3 = \begin{cases} u_6^{(3)} \phi_3^{(1)} & \text{in } T_1 \\ \phi_4^{(2)} + u_7^{(3)} \phi_2^{(2)} & \text{in } T_2 \\ \phi_4^{(3)} - u_6^{(3)} \phi_3^{(3)} - u_7^{(3)} \phi_2^{(3)} & \text{in } T_3 \end{cases}$$

$$\phi_4 = \begin{cases} \phi_4^{(1)} + u_6^{(4)} \phi_3^{(1)} & \text{in } T_1 \\ u_7^{(4)} \phi_2^{(2)} & \text{in } T_2 \\ -u_6^{(4)} \phi_3^{(3)} - u_7^{(4)} \phi_2^{(3)} & \text{in } T_3 \end{cases}$$

$$\phi_5 = \begin{cases} u_6^{(5)}\phi_4^{(1)} & \text{in } T_1 \\ \phi_1^{(2)} & + u_7^{(1)}\phi_2^{(2)} & \text{in } T_2 \\ \phi_1^{(3)} - u_6^{(1)}\phi_3^{(3)} - u_7^{(1)}\phi_2^{(3)} & \text{in } T_3 \end{cases}$$

Figure 9:
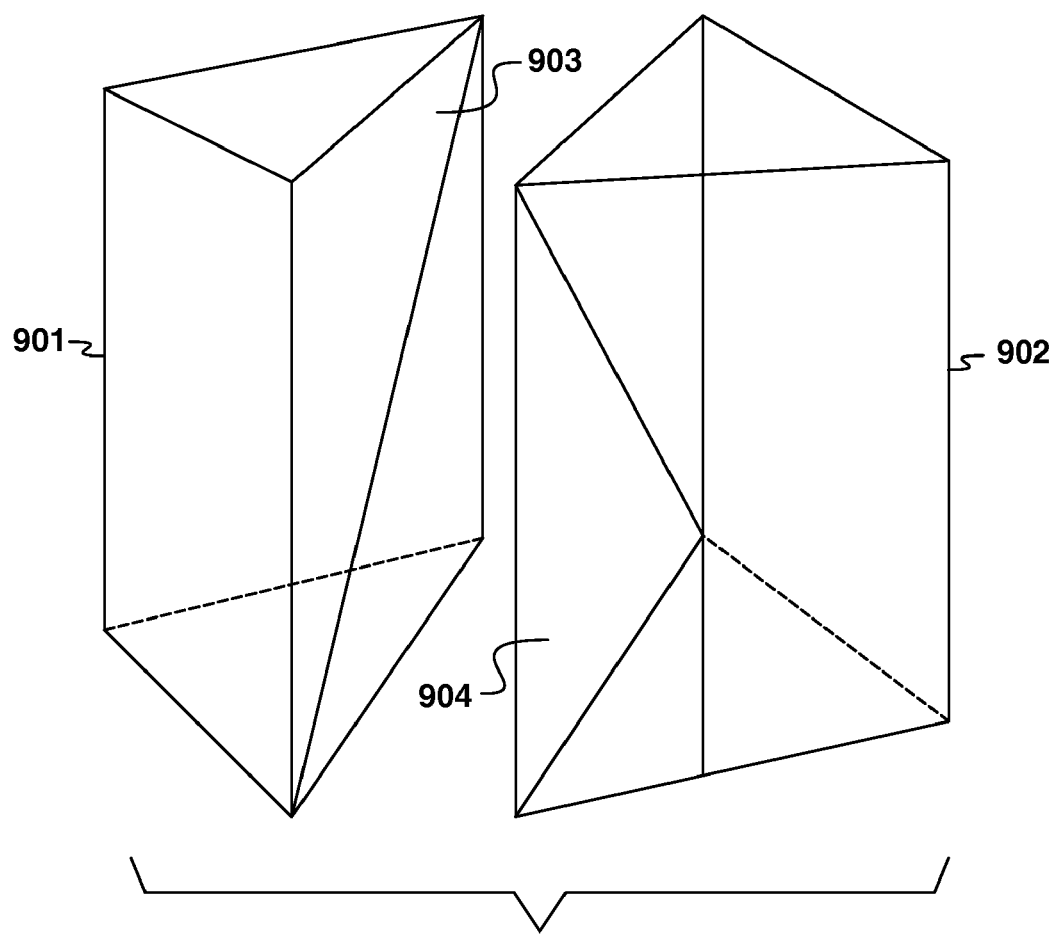
FIG. 9 depicts independent face splitting of neighboring cells, according to embodiments of the invention.

It is reasonable to emphasize the following distinction of the "div-const" approach. The partition of a grid cell into tetrahedrons is independent from the partition of its neighboring cells, e.g. a quadrilateral face which is a common for two neighboring cells can be divided in different ways from different sides. For example, FIG. 9 depicts two neighboring cells 901, 902 that have adjoining surfaces 903, 904 split in different manners. This feature simplifies generation of prismatic grids and discretization of boundary value problems on them comparing with tetrahedral grids.

For general prismatic cells, the approach described above for a prismatic cell with a triangular base may be extended to cover a generic prism Π. Every prism may be independently partitioned into tetrahedral and the finite element space $V_h|_\Pi$ is constructed using the "div-const" approach described in the previous sections.

The above paragraphs describe having one degree of freedom per each face of the cells at the face center for normal components of flux. Each cell is also assigned one degree of freedom associated at the cell center for each primary unknown. For example, primary unknown(s) may include ambient temperature and/or fluid pressure.

The following paragraphs describe using a hybrid version of mixed finite element (MFE) analysis on the cells of the 3D prismatic grid with the introduction of an additional degrees of freedom associated with the faces of the prisms. These degrees of freedom allow the separation of the flux of one cell from the flux of another cell. These degrees of freedom are known in mathematical literature as LaGrange multipliers. The introduction of the additional degrees of freedom allows for a simplification of the structure of the numerical problem, as the original variables, such as cell centered temperature (or pressure) and fluxes on the boundaries of one prismatic cell, become disconnected from the temperature and fluxes of any other cells. Thus, those unknowns can be eliminated, and that allows the reduction of the number of unknowns.

With the definitions provided above for the degrees of freedom, the MFE method can be introduced as follows: find $u_h \in V_h$, $p_h \in L_h$, and $\lambda_h \in \tilde{\Lambda}_h$ such that $$\int_\Omega (K^{-1} u_h) \cdot v \, dx - \int_\Omega p_h (\nabla \cdot v) \, dx + \int_{\Gamma_N} \lambda_h (v \cdot n) \, ds = \qquad (3.1)$$

$$- \int_{\Gamma_D} g_D (v \cdot n) \, ds$$

$$- \int_\Omega (\nabla \cdot u_h) q \, dx - \int_\Omega c \cdot p_h q \, dx = - \int_\Omega f q \, dx$$

$$\int_{\Gamma_N} (u_h \cdot n) \mu \, ds - \int_{\Gamma_N} \sigma \lambda_h \mu \, ds = \int_{\Gamma_N} g_N \mu \, ds$$

for all $v \in V_h$, $q \in L_h$, and $\mu \in \tilde{\Lambda}_h$. The finite element problem (3.1) results in the system of linear algebraic equations $$A \begin{pmatrix} \bar{u} \\ \bar{p} \\ \bar{\lambda} \end{pmatrix} = \begin{pmatrix} \bar{g}_D \\ \bar{f} \\ \bar{g}_N \end{pmatrix} \qquad (3.2)$$

with the saddle point matrix $$A = \begin{pmatrix} M & B^T & C^T \\ B & -D & 0 \\ C & 0 & -\Sigma \end{pmatrix} \qquad (3.3)$$

where $M = M^T$ is a positive definite matrix, and $D = D^T$ and $\Sigma = \Sigma^T$ are either positive definite or positive semi-definite matrices. It can be shown that system (3.2) has the unique solution.

Iterative methods for algebraic systems with symmetric saddle point matrices are well developed. However, the efficient preconditioning technique for the saddle point matrices which arise from MFE discretizations on polyhedral grids is still a concern. Symmetric positive definite matrices are much better objects for efficient preconditioning. The system (3.2) can be transformed to the equivalent system with a symmetric positive definite matrix by using the hybridization of the mixed finite element problem (3.1). In the next paragraphs, this method is described as preferable way of solving problem (3.1).

For hybridization of mixed finite element analysis, let $E_k$ be a grid cell in $\Omega_h$ and $V_h^{(k)}$ and $L_h^{(k)}$) be the restrictions of the finite element spaces $V_h$ and $L_h$ onto $E_k$, respectively. Also, new finite element space $\Lambda_h$ is created, which is the space of functions $\lambda_h = \lambda_h(x)$ that are defined on the interfaces $\Gamma_{kl}$ between grid cells as well as on the intersections of grid cells with boundary parts of $\Gamma_N$. On each of the interfaces a function $\lambda_h \in \Lambda_h$ equals to a constant.

To introduce the mixed hybrid finite element (MHFE) problem two additional finite element spaces and a number of the bilinear forms and linear functionals have to be defined. Two new finite element spaces are $$\hat{V}_h = \prod_{k=1}^n V_h^{(k)}$$

and $$\hat{L}_h = \prod_{k=1}^n L_h^{(k)},$$

where n is the number of cells $E_k$ in $\Omega_h$. Note that the dimension of any of the spaces $V_h^{(k)}$ is at most five, and the dimension of each $L_h^{(k)}$ is equal to one.

For elements $u, v \in \hat{V}_h$, $p$, $q \in \hat{L}_h$, and $\lambda$, $\mu \in \Lambda_h$ the following bilinear forms are introduced $$a(u, v) = \sum_{k=1}^n \int_{E_k} (K^{-1} u_k) \cdot v_k \, dx$$

$$b(v, p) = -\sum_{k=1}^n \int_{E_k} p_k \nabla \cdot v_k \, dx \equiv -\sum_{k=1}^n \hat{p}_k \int_{E_k} \nabla \cdot v_k \, dx$$

-continued $$c(v, \lambda) = \sum_{k=1}^{n} \int_{\Gamma_{kl}} \lambda(v_k \cdot n_{kl}) ds - \sum_{k=1}^{n} \int_{\Gamma_{lk}} \lambda(v_k \cdot n_{lk}) ds + \sum_{k=1}^{n} \int_{\partial E_k \cap \Gamma_N} \lambda(v_k \cdot n) ds$$

$$d(p, q) = \sum_{k=1}^{n} \int_{E_k} c \cdot p_k q_k \, dx \equiv \sum_{k=1}^{n} \hat{c}_k \hat{p}_k \hat{q}_k$$

$$\sigma(\lambda, \mu) = \sum_{k=1}^{n} \int_{\partial E_k \cap \Gamma_N} \sigma \lambda \mu \, ds \equiv \sum_{k=1}^{n} \sigma_{kN} \hat{\lambda}_N \hat{\mu}_N$$

where $u_k$, $v_k \in V_h^{(k)}$, $\hat{p}_k$ and $\hat{q}_k$ are the values of $p_k$, $q_k \in L_h^{(k)}$, $\hat{\lambda}_N$, $\hat{\mu}_N$ are the values of $\lambda$, $\mu \in \Lambda_h$, $n_{kl}$ is the unit normal to $\Gamma_{kl}$ directed from $E_k$ to $E_l$, $k < l$, and $$\hat{c}_k = \int_{E_k} c \, dx,$$

$$\sigma_{kN} = \int_{\partial E_k \cap \Gamma_N} \sigma \, ds.$$

Also, the following linear functionals are defined $$l_D(v) = -\sum_{k=1}^{n} \int_{\partial E_k \cap \Gamma_D} g_D(v_k \cdot n) ds$$

$$l_f(q) = -\sum_{k=1}^{n} \int_{E_k} fq \, dx$$

$$l_N(\mu) = -\sum_{k=1}^{n} \int_{\partial E_k \cap \Gamma_N} g_N \mu \, ds$$

where $v_k \in V_h^{(k)}$, $q_k \in L_h^{(k)}$, and $\mu \in \Lambda_h$.

With the above definitions, the equivalent mixed hybrid formulation of the finite element problem (3.1) reads as follows: find $u_h \in \hat{V}_h$, $p_h \in \hat{L}_h$, and $\lambda_h \in \Lambda_h$ such that $a(u_h,v)+b(v,p_h)+c(v,\lambda_h)=l_D(v)$ $b(u_h,q)-d(p_h,q)=l_f(q)$ $c(u_h,\mu)-\sigma(\lambda_h,\mu)=l_N(\mu)$ (3.4)

for all $v \in \hat{V}_h$, $q \in \hat{L}_h$, and $\mu \in \Lambda_h$.

Finite element problem (3.4) results in the system of linear algebraic equations $$A \cdot \begin{pmatrix} \bar{u} \\ \bar{p} \\ \bar{\lambda} \end{pmatrix} = \begin{pmatrix} \bar{g}_D \\ \bar{f} \\ \bar{g}_N \end{pmatrix}$$ (3.5)

with the saddle point matrix $$A = \begin{pmatrix} M & B^T & C^T \\ B & -D & 0 \\ C & 0 & -\Sigma \end{pmatrix},$$

where $$M = \begin{pmatrix} M_1 & & 0 \\ & \ddots & \\ 0 & & M_n \end{pmatrix}$$

is the block diagonal matrix with the symmetric positive definite submatrices $M_k$, $k=1, \ldots, n$, D is a diagonal positive definite or semi-definite matrix, and $\Sigma$ is a diagonal positive semi-definite matrix. The components of the right-hand side subvectors $\bar{g}_D$, $\bar{f}$, $\bar{g}_N$ are defined by the linear functionals in (3.4).

The matrix A has a very useful representation $$A = \sum_{i=1}^{n} N_i A_i N_i^T$$ (3.6)

where $$A_i = \begin{pmatrix} M_i & B_i^T & C_i^T \\ B_i & -D_i & 0 \\ C_i & 0 & -\Sigma_i \end{pmatrix}$$

is the local saddle point matrix for cell $E_i$ and $N_i$ is the corresponding assemble matrix.

Respectively, the right hand side of system (3.5) can be written as follows:

$$\begin{pmatrix} \bar{g}_D \\ \bar{f} \\ \bar{g}_N \end{pmatrix} = \sum_{i=1}^{n} N_i \begin{pmatrix} \bar{g}_{D,i} \\ \bar{f}_i \\ \bar{g}_{N,i} \end{pmatrix}.$$

It is important to observe that matrix $A_i$ and subvectors $\bar{g}_{D,i}$, $\bar{f}_i$, and $\bar{g}_{N,i}$ can be obtained by applying the local mixed finite element discretization for the following problem:

$u_i+K\nabla p_i=0$ in $E_i$ $\nabla \cdot u_i+c \cdot p_i=f_i$ in $E_i$ $p_i=g_D$ on $\partial E_i \cap \Gamma_D$ $-u_i \cdot n+\sigma p_i=g_N$ on $\partial E_i \cap \Gamma_N$ $u_i \cdot n_i^k=0$ on $\Gamma_i^k$ if $\partial E_i \cap \Gamma_D = \emptyset$ where $\Gamma_i^k$, $k=1, \ldots, s_i$ are the faces of cell $E_i$.

The important properties of matrices $M_i$, $B_i$, $C_i$, $D_i$, and $\Sigma_i$ in (2.6), can be demonstrated on an internal cell $E_i$, i.e. $\partial E_i \cap \partial \Omega_h = \emptyset$. Let cell $E_i$ have $s_i$ faces then $M_i \in R^{s_i \times s_i}$ is a symmetric positive definite matrix, then $B_i = -(|\Gamma_i^1| |\Gamma_i^2| \ldots |\Gamma_i^{s_i}|) \in R^{1 \times s_i}$, $C_i = \text{diag}(|\Gamma_i^1| |\Gamma_i^2| \ldots |\Gamma_i^{s_i}|) \in R^{s_i \times s_i}$, $D_i = c_i V_{E_i} \in R^{1 \times 1}$, where $V_{E_i}$ is the volume of cell $E_i$ and $$c_i = \frac{1}{V_{E_i}} \int_{E_i} c(x) \, dx.$$

For an internal cell matrix $\Sigma_i = 0$.

Let $\bar{e}_i = (1 \ 1 \ldots 1)^T \in R^{s_i}$. Then $B_i = -C_i \bar{e}_i$. This property holds for any $A_i$ from (3.6).

It is pertinent to note that primary variables $\bar{u}_i$ and $\bar{p}_i$, $i=1, \ldots, n$, are only connected within a single cell. So, these unknowns can easily be excluded:

$\bar{u}=M^{-1}(\bar{g}_D-C\bar{\lambda}-B\bar{p})$ (3.7)

and $$\bar{p}=(B^TM^{-1}B+D)^{-1}(B^TM^{-1}\bar{g}_D-\bar{f}-B^TM^{-1}C\bar{\lambda}). \quad (3.8)$$

Due to the structure of matrices M, B, and D, the matrix $B^TM^{-1}B+D$ is diagonal, therefore, it is invertible.

Using relationships (3.7) and (3.8) system (3.5) is transformed to the system:

$$S\bar{\lambda}=\bar{\xi} \quad (3.9)$$

where $$S=C^TM^{-1}C-C^TM^{-1}CB(B^TM^{-1}B+D)^{-1}B^TM^{-1}C+\Sigma$$

and $$\bar{\xi}=C^TM^{-1}\bar{g}_D-C^TM^{-1}B(B^TM^{-1}B+D)^{-1}(\bar{f}+B^TM^{-1}\bar{g}_D)-\bar{g}_N.$$

The matrix S is called "condensed matrix". This matrix is symmetric and positive definite except the case of Neumann boundary conditions when S is semi-positive definite, but has simple kernel-constant vector. This matrix is global in nature that connects all of the nodes or cells together. The large system of linear equations may be solved simultaneously.

Any iterative method can be applied to solve the system of linear equations (3.9) with that matrix. One method is Preconditioned Conjugate Gradient method (PCG), however other methods may be used. Note that in case of semi-positive definiteness PCG should be performed in the subspace orthogonal to the kernel. After solving system (3.9), primary unknowns $\bar{p}$ and $\bar{u}$ can be recovered locally element-by-element using equations (3.8) and (3.7), respectively.

The matrix S can be also presented as $$S = \sum_{i=1}^{n} \tilde{N}_i S_i \tilde{N}_i^T$$

where $$S_i = C_i^T M_i^{-1} C_i - C_i^T M_i^{-1} C_i B_i (B_i^T M_i^{-1} B_i + D_i)^{-1} B_i^T M_i^{-1} C_i + \sum_i$$

and $\tilde{N}_i$ are the corresponding assembling matrices. The right hand side of (3.9) has a similar representation.

Note that the embodiments of the invention may operate with a single primary unknown, e.g. temperature or pressure, and its associated flux. Other embodiments may operate with more than one primary unknown.

The various processes and methods outlined above may be combined in one or more different methods, used in one or more different systems, used in one or more different computer program products, according to various embodiments of the invention.

Figure 10:
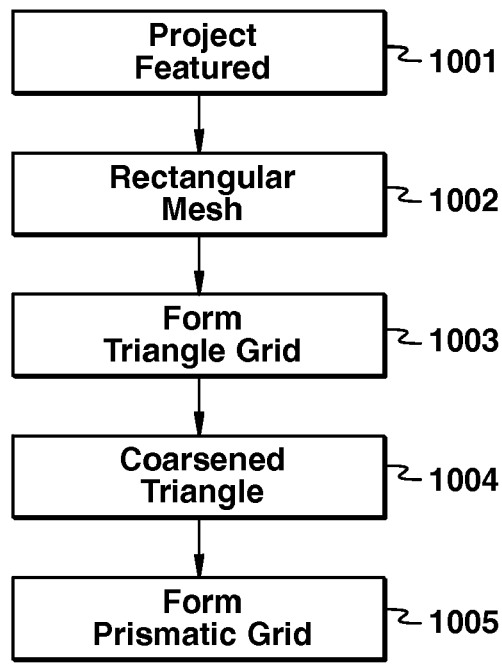
FIG. 10 depicts a method of forming a prismatic grid, according to embodiments of the invention.

For example, one exemplary method 1000 may be to form a prismatic grid as shown in FIG. 10. The geological and geometrical features of interest, such as pinch-out boundaries, fault lines, or well locations are projected into horizontal plane using orthogonal projection 1001. A fine rectangular conforming mesh is generated that covers all features of the projected domain of the same size as the fine grid on which the material data is provided 1002. The rectangular grid is separated in triangles 1003. The various lines and points on the grid can represent, for example, the fault lines and well locations. The triangles are coarsened in non-uniform manner 1004. It is desirable to keep fine triangulation near some geologic or geometric features, but having coarser resolution away from these features will allow for easier analysis. Such a grid is comprised only of triangles. The coarsened grid is projected vertically onto all boundary surfaces of all layers to form the prismatic grid 1005. Such a grid will contain cells, which can be triangular prisms, tetrahedrons, or pyramids. The unstructured prismatic grid built in such a way approximates boundary surfaces of all layers. Note that in convection-diffusion subsurface problems the input data is associated with millions of nodes.

Figure 11:
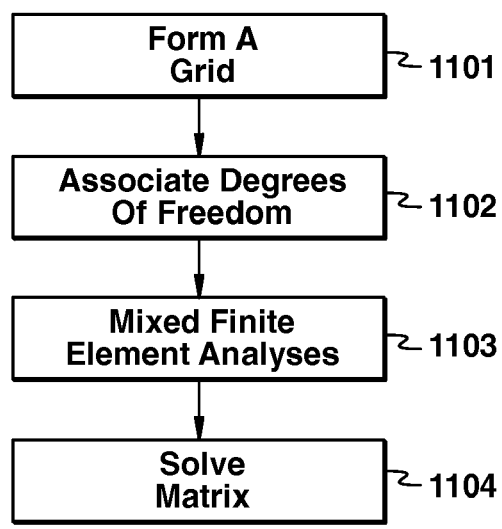
FIG. 11 depicts a method of solving a matrix, according to embodiments of the invention.

Another method may be to solve a convection-diffusion problem for a geologic basin 1100 as shown in FIG. 11. A grid is formed that models the basin, 1101. Note that the grid may be formed by the method 1000 shown in FIG. 10 or another method may be used. The method associates one degree of freedom per cell of the grid at the cell center for primary unknown and one degree of freedom per each face of the cells at the face center for normal components of flux 1102. The grid, with associated degrees of freedom is analyzed using a mixed finite element approach 1103. This analysis produces a sparse matrix equation. The method may then solve the matrix equation to get both, the primary unknown(s) and normal components of the flux of the unknown(s) at the faces of the cells 1104.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium or transmitted by a computer data signal. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 12:
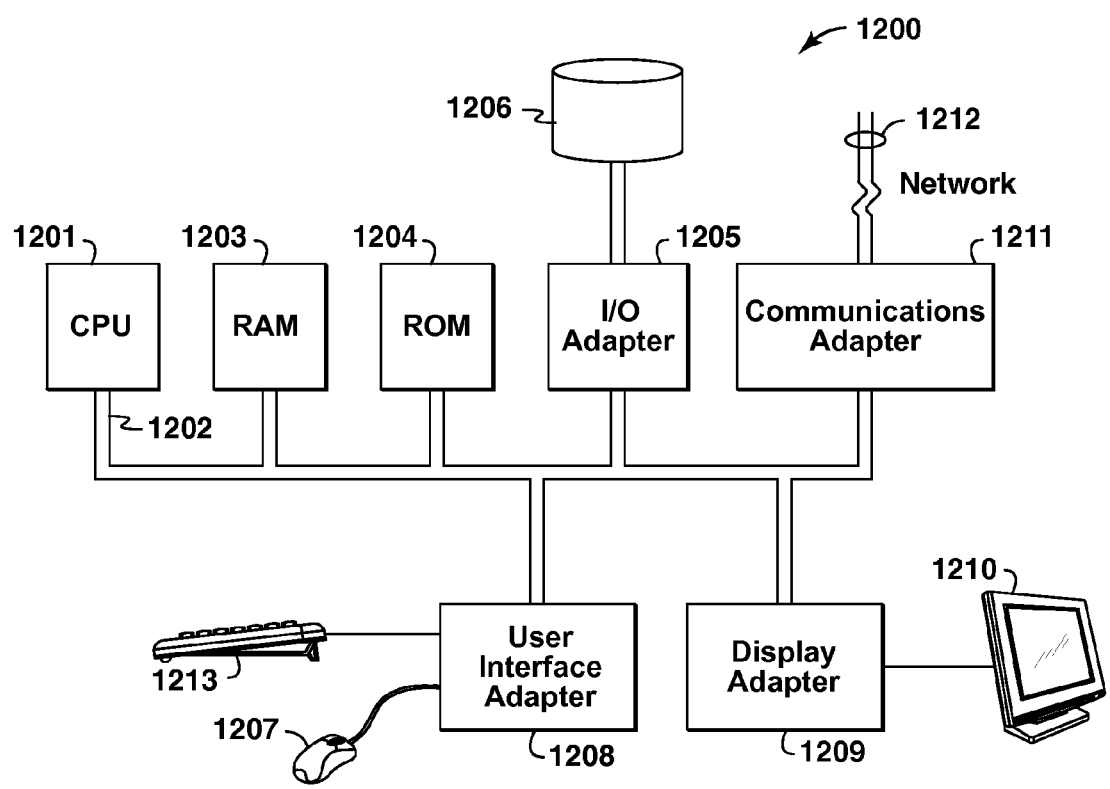
FIG. 12 depicts a block diagram of a computer system which is adapted to use the present invention.

FIG. 12 illustrates computer system 1200 adapted to use the present invention. Central processing unit (CPU) 1201 is coupled to system bus 1202. The CPU 1201 may be any general purpose CPU, such as an Intel Pentium processor. However, the present invention is not restricted by the architecture of CPU 1201 as long as CPU 1201 supports the inventive operations as described herein. Bus 1202 is coupled to random access memory (RAM) 1203, which may be SRAM, DRAM, or SDRAM. ROM 1204 is also coupled to bus 1202, which may be PROM, EPROM, or EEPROM. RAM 1203 and ROM 1204 hold user and system data and programs as is well known in the art.

Bus 1202 is also coupled to input/output (I/O) controller card 1205, communications adapter card 1211, user interface card 1208, and display card 1209. The I/O adapter card 1205 connects to storage devices 1206, such as one or more of a hard drive, a CD drive, a floppy disk drive, a tape drive, to the computer system. The I/O adapter 1205 is may connected to printer, which would allow the system to print paper copies of information such as document, photographs, articles, etc. Note that the printer may a printer (e.g. inkjet, laser, etc.), a fax machine, or a copier machine. Communications card 1211 is adapted to couple the computer system 1200 to a network 1212, which may be one or more of a telephone network, a local (LAN) and/or a wide-area (WAN) network, an Ethernet network, and/or the Internet network. User interface card 1208 couples user input devices, such as keyboard 1213 and pointing device 1207, to the computer system 1200. User interface card 1208 may also provides sound output to a user via speaker(s). The display card 1209 is driven by CPU 1201 to control the display on display device 1210.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for modeling on a computer a physical region, the method comprising:
   receiving data that defines at least one physical characteristic of the physical region;
   providing a triangular mesh on a plane of a model of the physical region, wherein the mesh comprises a plurality of cells, the model includes modeled features that model physical features in the physical region;
   assigning a priority value to each cell, wherein the value is determined based on whether each cell is proximate to a modeled feature and a type of the modeled feature;
   coarsening the triangular mesh in a non-uniform manner based on the assigned priority values; and
   projecting the coarsened triangular mesh in a direction orthogonal to the plane in the physical region to form a prismatic grid.

2. The method of claim 1, wherein providing a triangular mesh comprises:
   providing a rectangular mesh on the plane; and
   splitting each cell of the rectangular mesh along at least one diagonal.

3. The method of claim 1, wherein coarsening comprises:
   merging two adjacent triangles by eliminating a side common to the two adjacent triangles.

4. The method of claim 1, wherein the prismatic grid comprises a plurality of prism cells, a plurality of pyramid cells, and a plurality of tetrahedron cells.

5. The method of claim 1, wherein the method is used to model at least one flux of a physical process in the physical region, the method further comprising:
   assigning a plurality of degrees of freedom for the flux in each sub-cell;
   applying mixed finite element analysis to each of the sub-cells to produce a matrix; and
   solving the matrix to determine the flux of the physical process in the region.

6. The method of claim 5, wherein assigning comprises for each cell:
   assigning one degree of freedom for the physical process; and
   assigning another degree of freedom for each face of the cell.

7. The method of claim 5, wherein applying comprises:
   using a div-constant approach to form the finite element space.

8. The method of claim 5, wherein the physical process is a convection-diffusion process.

9. The method of claim 5, wherein the physical process is one of temperature and pressure and the physical region is a subsurface geological basin.

10. The method of claim 5, wherein the physical process involves the formation of hydrocarbon material.

11. The method of claim 5, wherein the physical process involves the movement of hydrocarbon material.

12. The method of claim 1, further comprising:
    deriving the data from information from a sensor that measured the at least one physical characteristic of the physical region.

13. A method for modeling a physical process and a flux of the physical process on a computer, the method comprising:
    forming an unstructured, prismatic grid that models a physical region, wherein the physical process operates within the physical region, wherein the forming comprises:
      providing a triangular mesh on a plane of a model of the physical region, wherein the mesh comprises a plurality of cells, the model includes modeled features that model physical features in the physical region,
      assigning a priority value to each cell, wherein the value is determined based on whether each cell is proximate to a modeled feature and a type of the modeled feature;
      coarsening the triangular mesh in a non-uniform manner based on the assigned priority values, and
      projecting the coarsened triangular mesh in a direction orthogonal to the plane in the physical region to form the prismatic grid;
    assigning a plurality of degrees of freedom for the physical process and the flux for each cell;
    applying mixed finite element analysis to each of the cells to produce a matrix; and
    solving the matrix to determine the physical process and the flux in the region.

14. The method of claim 13, wherein the prismatic grid comprises a plurality of prism cells, a plurality of pyramid cells, and a plurality of tetrahedron cells.

15. The method of claim 13, wherein assigning comprises:
    assigning one degree of freedom for the physical process for each cell; and
    assigning another degree of freedom for each face of the cell for each cell.

16. The method of claim 13, wherein applying comprises:
    using a div-constant approach to form the finite element space.

17. The method of claim 13, further comprising:
    using the determined physical process and flux to affect a change in the physical region.

18. The method of claim 13, wherein the physical process is one of temperature and pressure and the physical region is a subsurface geological basin.

19. A computer program product having a non-transitory computer readable medium having computer program logic recorded thereon for modeling a physical process and a flux of the physical process in a physical region, the computer program product comprising:
    code for forming an unstructured, prismatic grid that models the physical region, the code for forming comprises:

code for providing a triangular mesh on a plane of a model of the physical region, wherein the mesh comprises a plurality of cells, code for assigning a priority value to each cell, wherein the value is determined based on whether each cell is proximate to a modeled feature and a type of the modeled feature, code for coarsening the triangular mesh in a non-uniform manner based on the assigned priority values, and code for projecting the coarsened triangular mesh in a direction orthogonal to the plane in the physical region to form the prismatic grid;

code for applying mixed finite element analysis to the prismatic grid to produce a matrix; and code for solving the matrix thereby determining the physical process and the flux in the region.

20. The computer program product of claim 19, wherein the prismatic grid comprises a plurality of cells, and the code for applying comprises:

assigning one degree of freedom for the physical process to each cell;

assigning another degree of freedom for each face of the cell to each cell; and using a div-constant approach to form the finite element space.

21. The computer program product of claim 19, wherein the code for solving comprises:

using preconditioned conjugate gradient analysis to solve the matrix.

* * * * *